US012615390B2

(12) United States Patent
Van der Auwera et al.

(10) Patent No.: US 12,615,390 B2
(45) Date of Patent: Apr. 28, 2026

(54) V-DMC DISPLACEMENT VECTOR QUANTIZATION

(71) Applicant: QUALCOMM Incorporated, San Diego, CA (US)

(72) Inventors: Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/630,686

(22) Filed: Apr. 9, 2024

(65) Prior Publication Data

US 2024/0348825 A1 Oct. 17, 2024

Related U.S. Application Data

(60) Provisional application No. 63/495,508, filed on Apr. 11, 2023.

(51) Int. Cl.
 *H04N 19/597* (2014.01)
 *H04N 19/30* (2014.01)
 *H04N 19/60* (2014.01)

(52) U.S. Cl.
 CPC .......... *H04N 19/597* (2014.11); *H04N 19/30* (2014.11); *H04N 19/60* (2014.11)

(58) Field of Classification Search
 CPC ....... H04N 19/597; H04N 19/30; H04N 19/60
 See application file for complete search history.

(56) References Cited

U.S. PATENT DOCUMENTS

2024/0357144 A1* 10/2024 Van Der Auwera ... H04N 19/44

FOREIGN PATENT DOCUMENTS

WO WO-2024184588 A1 * 9/2024 ............. G06T 9/004

OTHER PUBLICATIONS

"Information Technology-Coded Representation of Immersive Media-Part 29: Video-Based Dynamic Mesh Coding (V- DMC)," WD 2.0 of V-DMC, 141. MPEG Meeting, Jan. 16, 2023-Jan. 20, 2023, Online, (Motion Picture Expert Group or ISO/IEC JTC1/SC29/WG11), No. n22474, 74 Pages, Feb. 11, 2023, XP030308350, Feb. 10, 2023, Sections 8.3.6.1.4, 9.3, 11.5, 11.6, 11.7, 11.9.

(Continued)

*Primary Examiner* — Jae N Noh
(74) *Attorney, Agent, or Firm* — QUALCOMM Incorporated; Espartaco Diaz Hidalgo

(57) ABSTRACT

A device for decoding encoded mesh data can be configured to determine, based on the encoded mesh data, a base mesh; determine, based on the encoded mesh data, a set of coefficients; receive in the encoded mesh data a quantization parameter value; receive in the encoded mesh data a bit depth offset value; determine an inverse scaling factor based on the quantization parameter value and the bit depth offset value; perform an inverse scaling on the set of coefficients based on the inverse scaling factor to determine a set of de-quantized coefficients; determine a displacement vector based on the set of de-quantized coefficients; deform the base mesh based on the displacement vector to determine a decoded mesh; and output the decoded mesh.

30 Claims, 9 Drawing Sheets

(56) References Cited

OTHER PUBLICATIONS

International Search Report and Written Opinion—PCT/US2024/023875—ISA/EPO—Jul. 12, 2024 11 Pages.

Van Der Auwera G (Qualcomm)., et al., "[V-DMC][EE4.7] Test 1.3 Result," International Organisation for Standardisation Organisation Internationale De Normalisation, Coding of Moving Pictures and Audio, 144. MPEG Meeting, Oct. 16, 2023-Oct. 20, 2023, Hannover, (Motion Picture Expert Group or ISO/IEC JTC1/SC29/WG7), No. m65376, Oct. 16, 2023, XP030312948, 12 Pages, The Whole Document.

Van Der Auwera G (Qualcomm)., et al., "[V-DMC][New] on Displacement Vector Coding," International Organisation for Standardisation Organisation Internationale De Normalisation, Coding of Moving Pictures and Audio, 142. MPEG Meeting, Apr. 24, 2023-Apr. 28, 2023, Antalya, (Motion Picture Expert Group or ISO/IEC JTC1/SC29/WG7), No. m63257, 12 Pages, Apr. 19, 2023, XP030310366, The Whole Document.

Fusell D., "Subdivision curves," University of Texas at Austin, 2010, pp. 1-20.

Garland M., et al., "Surface Simplification Using Quadric Error Metrics," Proceedings of the 24th annual conference on Computer Graphics and Interactive Techniques, Aug. 3, 1997, 8 Pages.

Kolarov K., et al., "Wavelet Compression for 3D and Higher Dimensional Objects," SPIE Conference on Applications of Digital Image Processing, vol. 3164, San Diego, 1997, pp. 1-13.

Microsoft Learn: "Using UVAtlas (Direct 3D 9)," Jun. 8, 2021, pp. 1-9.

Sweldens W., et al., "Building Your Own Wavelets at Home," Morning Section: Introductory Material, 1996, 76 Pages.

* cited by examiner b(i) – Compressed Bitstream
A''(i) – Decoded Attribute Map
M''(i) – Decoded Mesh
m''(i) – Decoded Base Mesh
d''(i) – Decoded Displacements $S^2$ $S^1$ $S^0$

V-DMC DISPLACEMENT VECTOR QUANTIZATION

This application claims the benefit of U.S. Provisional Patent Application No. 63/495,508, filed 11 Apr. 2023, the entire contents of which is incorporated herein by reference.

TECHNICAL FIELD

This disclosure relates to video-based coding of dynamic meshes.

BACKGROUND

Meshes may be used to represent physical content of a 3-dimensional space. Meshes may have utility in a wide variety of situations. For example, meshes may be used in the context of representing the physical content of an environment for purposes of positioning virtual objects in an extended reality, e.g., augmented reality (AR), virtual reality (VR), or mixed reality (MR), application. Mesh compression is a process for encoding and decoding meshes. Encoding meshes may reduce the amount of data required for storage and transmission of the meshes.

SUMMARY

To reduce the number of bits needed to signal displacement vectors in a compressed bitstream of mesh data, a mesh encoder may transform the displacements into a set of coefficients and scale, e.g., quantize, the coefficients. Existing techniques for scaling the coefficients, however, lack the ability to utilize many potentially desirable scaling factors for large coefficients at high bit depths and for small coefficients at low depths. Additionally, at some bit depths, a lossless scaling factor of 1.0 may not be available. The techniques of this disclosure include receiving in encoded mesh data a quantization parameter value and receiving in the encoded mesh data a bit depth offset value. By including the additional bit depth offset value, the techniques of this disclosure may enable mesh encoders and decoders to have more flexibility in determining scaling factors and inverse scaling factors across different bit depths and across different coefficient values.

According to an example of this disclosure, a device for decoding encoded mesh data includes: one or more memory units; one or more processing units implemented in circuitry, coupled to the one or more memory units, and configured to: determine, based on the encoded mesh data, a base mesh; determine, based on the encoded mesh data, a set of coefficients; receive in the encoded mesh data a quantization parameter value; receive in the encoded mesh data a bit depth offset value; determine an inverse scaling factor based on the quantization parameter value and the bit depth offset value; perform an inverse scaling on the set of coefficients based on the inverse scaling factor to determine a set of de-quantized coefficients; determine a displacement vector based on the set of de-quantized coefficients; deform the base mesh based on the displacement vector to determine a decoded mesh; and output the decoded mesh.

According to an example of this disclosure, a method of decoding encoded mesh data includes: determining, based on the encoded mesh data, a base mesh; determining, based on the encoded mesh data, a set of coefficients; receiving in the encoded mesh data a quantization parameter value; receiving in the encoded mesh data a bit depth offset value; determining an inverse scaling factor based on the quantization parameter value and the bit depth offset value; performing an inverse scaling on the set of coefficients based on the inverse scaling factor to determine a set of de-quantized coefficients; determining a displacement vector based on the set of de-quantized coefficients; deforming the base mesh based on the displacement vector to determine a decoded mesh; and outputting the decoded mesh.

A computer-readable storage medium stores instructions that when executed by one or more processors cause the one or more processors to: determine, based on encoded mesh data, a base mesh; determine, based on the encoded mesh data, a set of coefficients; receive in the encoded mesh data a quantization parameter value; receive in the encoded mesh data a bit depth offset value; determine an inverse scaling factor based on the quantization parameter value and the bit depth offset value; perform an inverse scaling on the set of coefficients based on the inverse scaling factor to determine a set of de-quantized coefficients; determine a displacement vector based on the set of de-quantized coefficients; deform the base mesh based on the displacement vector to determine a decoded mesh; and output the decoded mesh.

According to an example of this disclosure, a device for encoding encoded mesh data includes: one or more memory units; one or more processing units implemented in circuitry, coupled to the one or more memory units, and configured to: determine, from on an unencoded mesh, a base mesh; determine a set of displacement vectors for deforming the base mesh; transform the set of displacement vectors to determine a set of coefficients; perform a scaling on the set of coefficients based on a scaling factor to determine a set of scaled coefficients, wherein the scaling factor is a function of a quantization parameter value and a bit depth offset value; and generate an encoded bitstream that includes the quantization parameter value and the bit depth offset value.

The details of one or more examples are set forth in the accompanying drawings and the description below. Other features, objects, and advantages will be apparent from the description, drawings, and claims.

DETAILED DESCRIPTION

Figure 1:
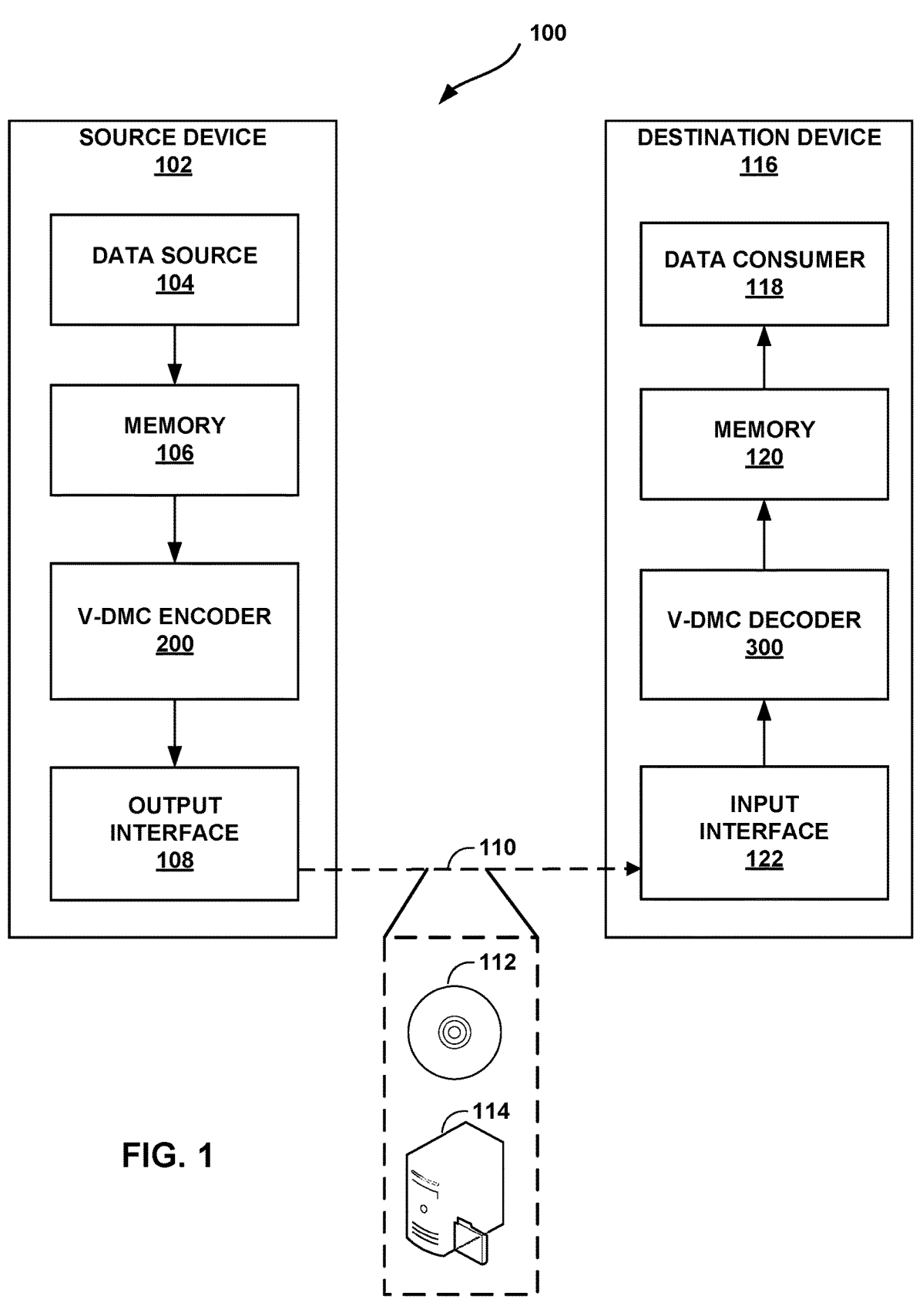
FIG. 1 is a block diagram illustrating an example encoding and decoding system that may perform the techniques of this disclosure.

A mesh generally refers to a collection of vertices in a three-dimensional (3D) space that collectively represent one or multiple objects in the 3D space. The vertices are connected by edges, and the edges form polygons, which form faces of the mesh. Each vertex may also have one or more associated attributes, such as a texture or a color. In most scenarios, having more vertices produces higher quality, e.g., more detailed and more realistic, meshes. Having more vertices, however, also requires more data to represent the mesh.

To reduce the amount of data needed to represent the mesh, the mesh may be encoded using lossy or lossless encoding. In lossless encoding, the decoded version of the encoded mesh exactly matches the original mesh. In lossy encoding, by contrast, the process of encoding and decoding the mesh causes loss, such as distortion, in the decoded version of the encoded mesh.

In one example of a lossy encoding technique for meshes, a mesh encoder decimates an original mesh to determine a base mesh. To decimate the original mesh, the mesh encoder subsamples or otherwise reduces the number of vertices in the original mesh, such that the base mesh is a rough approximation, with fewer vertices, of the original mesh. The mesh encoder then subdivides the decimated mesh. That is the mesh encoder estimates the locations of additional vertices in between the vertices of the base mesh. The mesh encoder then deforms the mesh by moving the vertices in a manner that makes the deformed mesh more closely match the original mesh.

After determining a desired base mesh and deformation of the subdivided mesh, the mesh encoder generates a bitstream that includes data for constructing the base mesh and data for performing the deformation. The data defining the deformation may be signaled as a series of displacement vectors that indicate the movement, or displacement, of the additional vertices determined by the subdividing process. To decode a mesh from the bitstream, a mesh decoder reconstructs the base mesh based on the signaled information, applies the same subdivision process as the mesh encoder, and then displaces the additional vertices based on the signaled displacement vectors.

To reduce the number of bits needed to signal displacement vectors, the mesh encoder may transform the displacements into a set of coefficients and scale, e.g., quantize, the coefficients. Existing techniques for scaling the coefficients, however, lack the ability to utilize many potentially desirable scaling factors for large coefficients at high bit depths and for small coefficients at low depths. Additionally, at some bit depths a lossless scaling factor of 1.0 may not be available. The techniques of this disclosure include receiving in encoded mesh data a quantization parameter value and receiving in the encoded mesh data a bit depth offset value. By including the additional bit depth offset value, the techniques of this disclosure may enable mesh encoders and decoders to have more flexibility in determining scaling factors and inverse scaling factors across different bit depths and across different coefficient values.

FIG. 1 is a block diagram illustrating an example encoding and decoding system 100 that may perform the techniques of this disclosure. The techniques of this disclosure are generally directed to coding (encoding and/or decoding) meshes. The coding may be effective in compressing and/or decompressing data of the meshes.

As shown in FIG. 1, system 100 includes a source device 102 and a destination device 116. Source device 102 provides encoded data to be decoded by a destination device 116. Particularly, in the example of FIG. 1, source device 102 provides the data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a V-DMC encoder 200, and an output interface 108. Destination device 116 includes an input interface 122, a V-DMC decoder 300, a memory 120, and a data consumer 118. In accordance with this disclosure, V-DMC encoder 200 of source device 102 and V-DMC decoder 300 of destination device 116 may be configured to apply the techniques of this disclosure related to displacement vector quantization. Thus, source device 102 represents an example of an encoding device, while destination device 116 represents an example of a decoding device. In other examples, source device 102 and destination device 116 may include other components or arrangements. For example, source device 102 may receive data from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to displacement vector quantization. Source device 102 and destination device 116 are merely examples of such devices in which source device 102 generates coded data for transmission to destination device 116. This disclosure refers to a "coding" device as a device that performs coding (encoding and/or decoding) of data. Thus, V-DMC encoder 200 and V-DMC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (e.g., raw, unencoded data) and may provide a sequential series of "frames" of the data to V-DMC encoder 200, which encodes data for the frames. Data source 104 may, for example, execute a framework or platform for generating graphics for video games, augmented reality, simulations, or any other such use case. Data source 104 of source device 102 may include a graphics engine that generates raw mesh data from any combination of one or more sensors configured to obtain real-world data. Examples of such sensors include cameras, 2D scanners, 3D scanners, light detection and ranging (LIDAR) devices, video cameras, ultrasonic sensors, infrared sensors, inertial measurement sensors, sonar sensors, pressure sensors, thermal imaging sensors, magnetic sensors, laser range finders, photodetectors, and the like. In other examples, the graphics engine may generate meshes that are entirely computer generated, i.e., not representative of a real world scene, using modeling, simulation, animation, generative adversarial networks, and the like. In yet other examples, data source 104 may not include a graphics engine, but instead, may obtain the mesh data from a storage unit or other device.

Regardless of whether the mesh data is based on real-world sensor data, entirely computer generated, obtained from an external source, or some combination thereof, V-DMC encoder 200 encodes the mesh data. V-DMC encoder 200 may rearrange the frames from the received order (sometimes referred to as "display order") into a coding order for coding. V-DMC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from V-DMC decoder 300. Additionally or alternatively, memory 106 and memory 120 may store software instructions executable by, e.g., V-DMC encoder 200 and V-DMC decoder 300, respectively. Although memory 106 and memory 120 are shown separately from V-DMC encoder 200 and V-DMC decoder 300 in this example, it should be understood that V-DMC encoder 200 and V-DMC decoder 300 may also include internal memories for functionally similar or equivalent purposes. Furthermore, memory 106 and memory 120 may store encoded data, e.g., output from V-DMC encoder 200 and input to V-DMC decoder 300. In some examples, portions of memory 106 and memory 120 may be allocated as one or more buffers, e.g., to store raw, decoded, and/or encoded data. For instance, memory 106 and memory 120 may store data representing a mesh.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to V-DMC encoder 200 and/or output interface 108, and destination device 116 may include an SoC device to perform the functionality attributed to V-DMC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by V-DMC encoder 200, which is also used by V-DMC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on meshes.

V-DMC encoder 200 and V-DMC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of V-DMC encoder 200 and V-DMC decoder 300 may be included in one or more encoders or decoders, either of which may be integrated as part of a combined encoder/decoder (CODEC) in a respective device. A device including V-DMC encoder 200 and/or V-DMC decoder 300 may comprise one or more integrated circuits, microprocessors, and/or other types of devices.

V-DMC encoder 200 and V-DMC decoder 300 may operate according to a coding standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, V-DMC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure addresses various improvements of the displacement vector quantization process in the video-based coding of dynamic meshes (V-DMC) technology that is being standardized in MPEG WG7 (3DGH).

The MPEG working group 7 (WG7), also known as the 3D graphics and haptics coding group (3DGH), is currently standardizing the video-based coding of dynamic mesh representations (V-DMC) targeting XR use cases. The current test model is based on the call for proposals result, Khaled Mammou, Jungsun Kim, Alexandros Tourapis, Dimitri Podborski, Krasimir Kolarov, [V-CG] Apple's Dynamic Mesh Coding CfP Response, ISO/IEC JTC1/SC29/WG7, m59281, April 2022, and encompasses the pre-processing of the input meshes into approximated meshes with typically fewer vertices named the base meshes, which are coded with a static mesh coder (cfr. Draco, etc.). In addition, the encoder may estimate the motion of the base mesh vertices and code the motion vectors into the bitstream. The reconstructed base meshes may be subdivided into finer meshes with additional vertices and, hence, additional triangles. The encoder may refine the positions of the subdivided mesh vertices to approximate the original mesh. The refinements or vertex displacement vectors may be coded into the bitstream. In the current test model, the displacement vectors are wavelet transformed, quantized, and the coefficients are packed into a 2D frame. The sequence of frames is coded with a typical video coder, for example, HEVC or VVC, into the bitstream. In addition, the sequence of texture frames is coded with a video coder.

Figure 2:
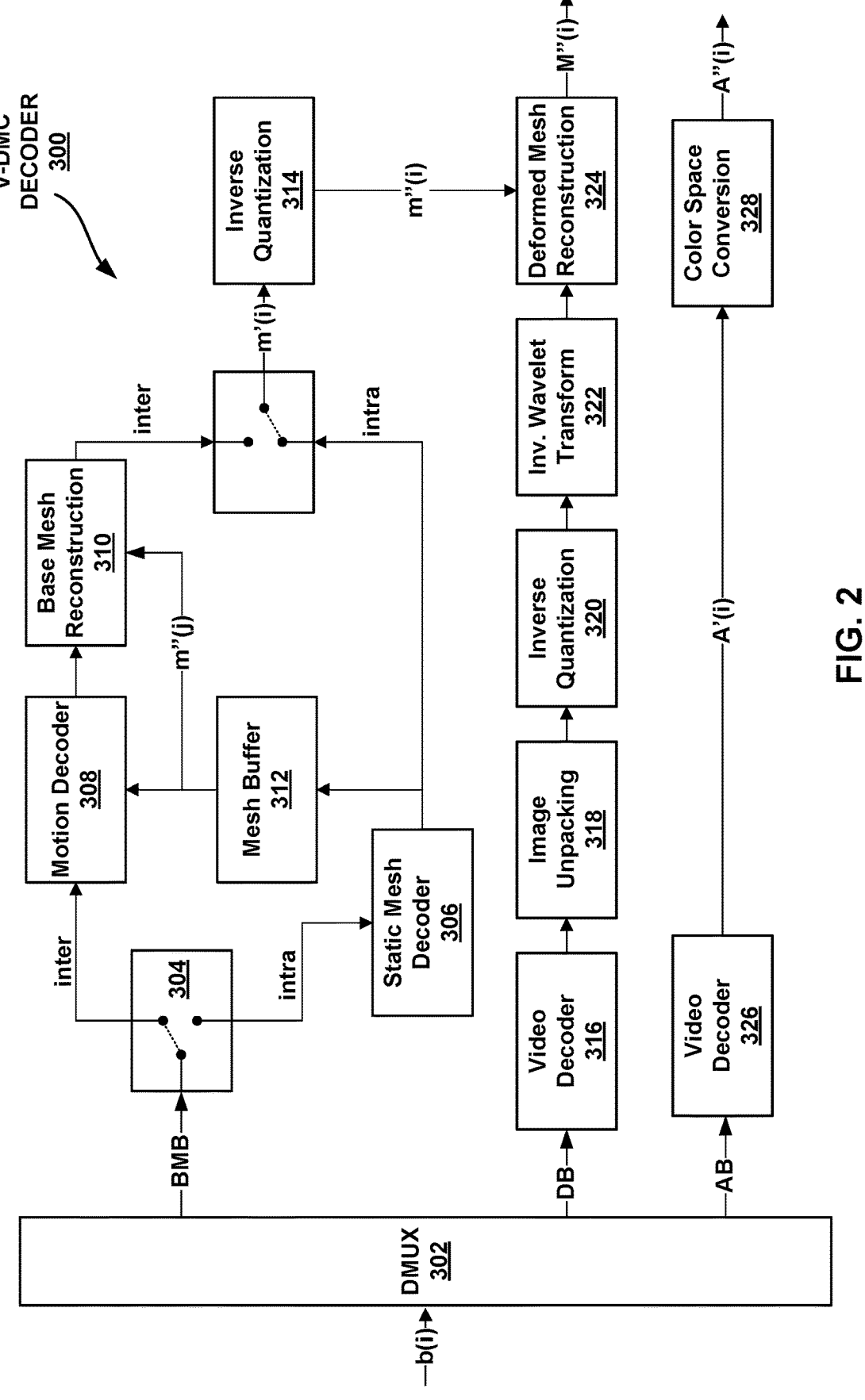
FIG. 2 shows an example of a V-DMC decoder.

FIG. 2 shows an example implementation V-DMC decoder 300, which may be configured to perform the decoding process as set forth in WD 2.0 of V-DMC, ISO/IEC JTC1/SC29/WG7, N00546, January 2023. The processes described with respect to FIG. 2 may also be performed, in full or in part, by V-DMC encoder 200.

V-DMC decoder 300 includes demultiplexer (DMUX) 302, which receives compressed bitstream b (i) and separates the compressed bitstream into a base mesh bitstream (BMB), a displacement bitstream (DB), and an attribute bitstream (AB). Mode select unit 304 determines if the base mesh data is encoded in an intra mode or an inter mode. If the base mesh is encoded in an intra mode, then static mesh decoder 306 decodes the mesh data without reliance on any previously decoded meshes. If the base mesh is encoded in an inter mode, then motion decoder 308 decodes motion, and base mesh reconstruction unit 310 applies the motion to an already decoded mesh (m"(j)) stored in mesh buffer 312 to determine a reconstructed quantized base mesh (m'(i))). Inverse quantization unit 314 applies an inverse quantization to the reconstructed quantized base mesh to determine a reconstructed base mesh (m"(i)).

Video decoder 316 decodes the displacement bitstream to determine a set or frame of quantized transform coefficients. Image unpacking unit 318 unpacks the quantized transform coefficients. For example, video decoder 316 may decode the quantized transform coefficients into a frame, where the quantized transform coefficients are organized into blocks with particular scanning orders. Image unpacking unit 318 converts the quantized transform coefficients from being organized in the frame into an ordered series. In some implementations, the quantized transform coefficients may be directly coded, using a context-based arithmetic coder for example, and unpacking may be unnecessary.

Regardless of whether the quantized transform coefficients are decoded directly or in a frame, inverse quantization unit 320 inverse quantizes, e.g., inverse scales, quantized transform coefficients to determine de-quantized transform coefficients. Inverse wavelet transform unit 322 applies an inverse transform to the de-quantized transform coefficients to determine a set of displacement vectors. Deformed mesh reconstruction unit 324 deforms the reconstructed base mesh using the decoded displacement vectors to determine a decoded mesh (M"(i)).

Video decoder 326 decodes the attribute bitstream to determine decoded attribute values (A'(i)), and color space conversion unit 328 converts the decoded attribute values into a desired color space to determine final attribute values (A"(i)). The final attribute values correspond to attributes, such as color or texture, for the vertices of the decoded mesh.

A detailed description of the proposal that was selected as the starting point for the V-DMC standardization can be found in m59281. The following description will detail the displacement vector coding in the current V-DMC test model and WD 2.0.

Figure 3:
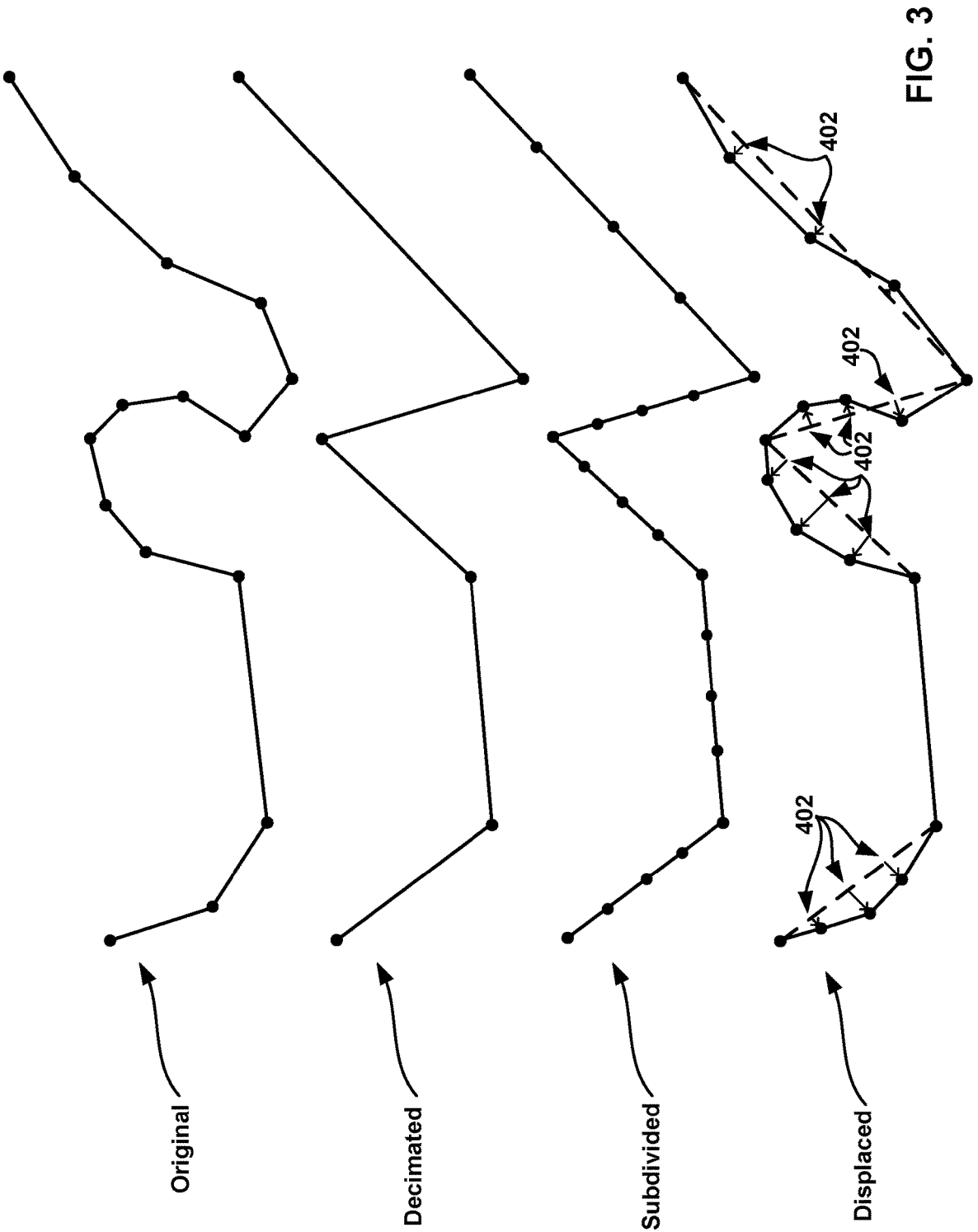
FIG. 3 shows an example of resampling to enable efficient compression of a 2D curve.

V-DMC encoder 200 and V-DMC decoder 300 may be configured to perform preprocessing. FIG. 3 illustrates the basic idea behind the proposed pre-processing scheme by using a 2D curve. The same concepts are applied to the input 3D mesh M(i) to produce a base mesh m(i) and a displacement field d(i).

In FIG. 3, the input 2D curve (represented by a 2D polyline), referred to as the "original" curve, is first down-sampled to generate a base curve/polyline, referred to as the "decimated" curve. A subdivision scheme, such as that described in Garland et al, Surface Simplification Using Quadric Error Metrics (https://www.cs.cmu.edu/~garland/Papers/quadrics.pdf), is then applied to the decimated polyline to generate a "subdivided" curve. For instance, in FIG. 3, a subdivision scheme using an iterative interpolation scheme is applied. It consists of inserting at each iteration a new point in the middle of each edge of the polyline. In the example illustrated, two subdivision iterations were applied.

Figure 4:
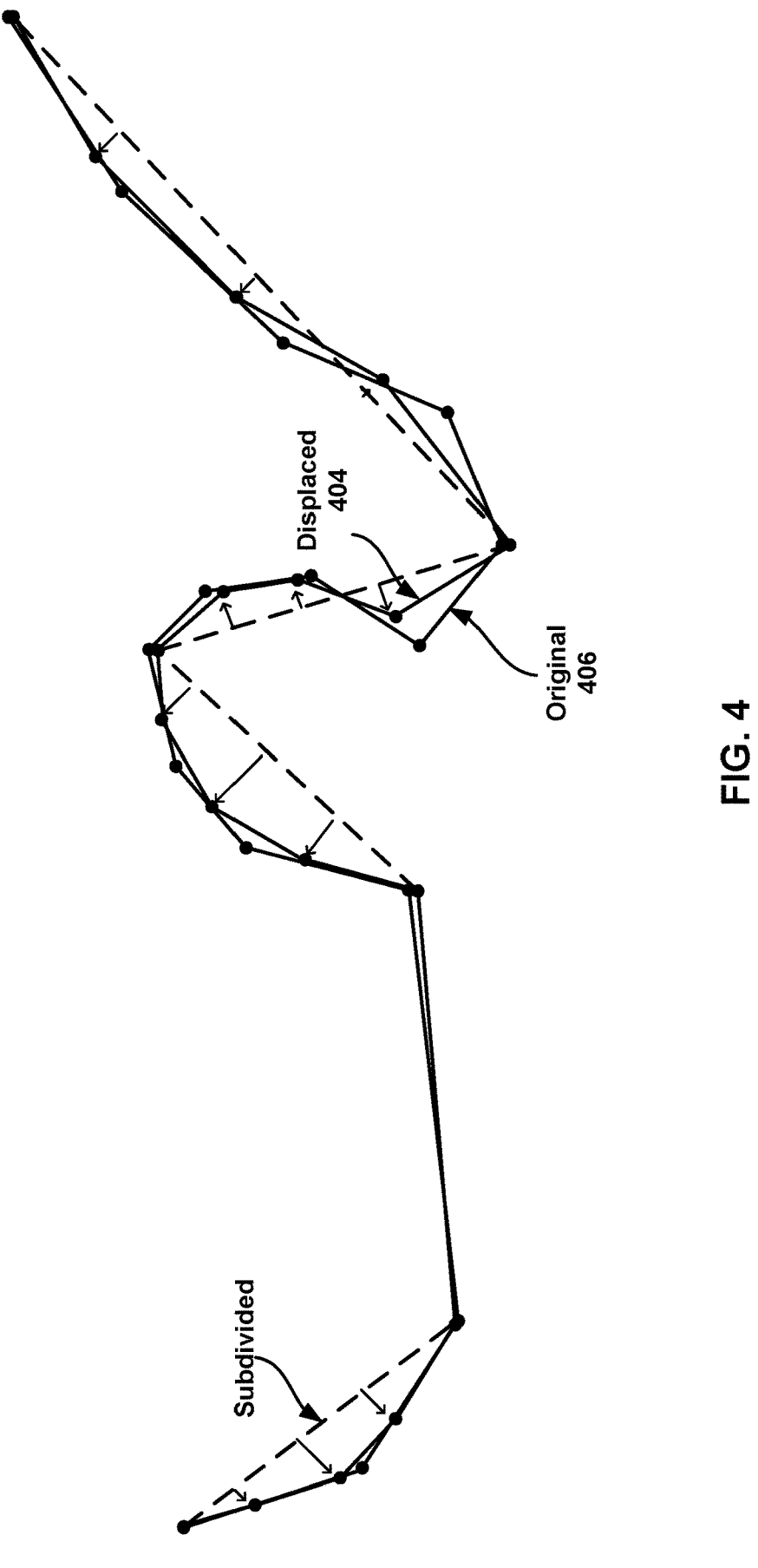
FIG. 4 shows a displaced curve that has a subdivision structure, while approximating the shape of the original mesh.

The proposed scheme is independent of the chosen subdivision scheme and may be combined with other subdivision schemes. The subdivided polyline is then deformed to get a better approximation of the original curve. More precisely, a displacement vector is computed for each vertex of the subdivided mesh (arrows 402 in FIG. 3) such that the shape of the displaced curve is as close as possible to the shape of the original curve (see FIG. 4). As illustrated by portion 404 of the displaced curve and portion 406 of the original curve, for example, the displaced curve may not perfectly match the original curve.

An advantage of the subdivided curve is that it has a subdivision structure that allows efficient compression, while it offers a faithful approximation of the original curve. The compression efficiency is obtained thanks to the following properties:

The decimated/base curve has a low number of vertices and requires a limited number of bits to be encoded/transmitted.

The subdivided curve is automatically generated by the decoder once the base/decimated curve is decoded (i.e., no need for any information other than the subdivision scheme type and subdivision iteration count).

The displaced curve is generated by decoding the displacement vectors associated with the subdivided curve vertices. Besides allowing for spatial/quality scalability, the subdivision structure enables efficient transforms such as wavelet decomposition, which can offer high compression performance.

Figure 5:
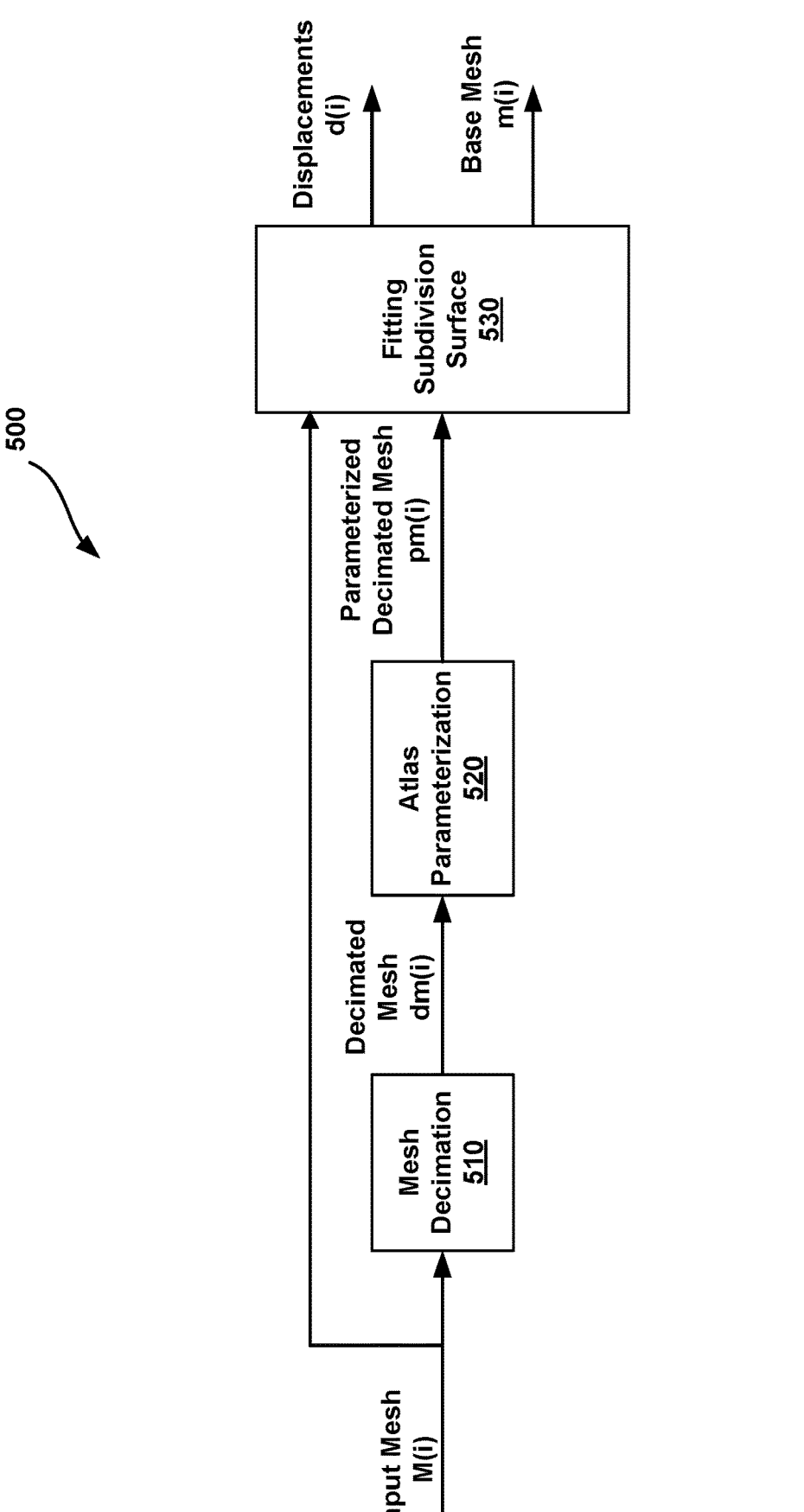
FIG. 5 shows a block diagram of a pre-processing system.

FIG. 5 shows a block diagram of pre-processing system 500 which may be included in V-DMC encoder 200 or may be separate from V-DMC encoder 200. In the example of FIG. 5, pre-processing system 500 includes mesh decimation unit 510, atlas parameterization unit 520, and subdivision surface fitting unit 530.

Mesh decimation unit 510 uses a simplification technique to decimate the input mesh M(i) and produce the decimated mesh dm(i). The decimated mesh dm(i) is then re-parameterized by atlas parameterization unit 520, which may for example use the UVAtlas tool. The generated mesh is denoted as pm(i). The UVAtlas tool considers only the geometry information of the decimated mesh dm(i) when computing the atlas parameterization, which is likely suboptimal for compression purposes. Better parameterization schemes or tools may also be considered with the proposed framework.

Applying re-parameterization to the input mesh makes it possible to generate a lower number of patches. This reduces parameterization discontinuities and may lead to better RD performance. Subdivision surface fitting unit 530 takes as input the re-parameterized mesh pm(i) and the input mesh M(i) and produces the base mesh m(i) together with a set of displacements d(i). First, pm(i) is subdivided by applying the subdivision scheme. The displacement field d(i) is computed by determining for each vertex of the subdivided mesh the nearest point on the surface of the original mesh M(i).

For the Random Access (RA) condition, a temporally consistent re-meshing may be computed by considering the base mesh m(j) of a reference frame with index j as the input for subdivision surface fitting unit 530. This makes it possible to produce the same subdivision structure for the current mesh M'(i) as the one computed for the reference mesh M'(j). Such a re-meshing process makes it possible to skip the encoding of the base mesh m(i) and re-use the base mesh m(j) associated with the reference frame M(j). This may also enable better temporal prediction for both the attribute and geometry information. More precisely, a motion field f(i) describing how to move the vertices of m(j) to match the positions of m(i) is computed and encoded. Note that such time-consistent re-meshing is not always possible. The proposed system compares the distortion obtained with and without the temporal consistency constraint and chooses the mode that offers the best RD compromise.

Note that the pre-processing system is not normative and may be replaced by any other system that produces displaced subdivision surfaces. A possible efficient implementation would constrain the 3D reconstruction unit to directly generate displaced subdivision surface and avoids the need for such pre-processing.

V-DMC encoder 200 and V-DMC decoder 300 may be configured to perform displacements coding. Depending on the application and the targeted bitrate/visual quality, the encoder may optionally encode a set of displacement vectors associated with the subdivided mesh vertices, referred to as the displacement field d(i), as described in this section. The intra encoding process, which may be performed by V-DMC encoder 200, is illustrated in FIG. 6.

Figure 6:
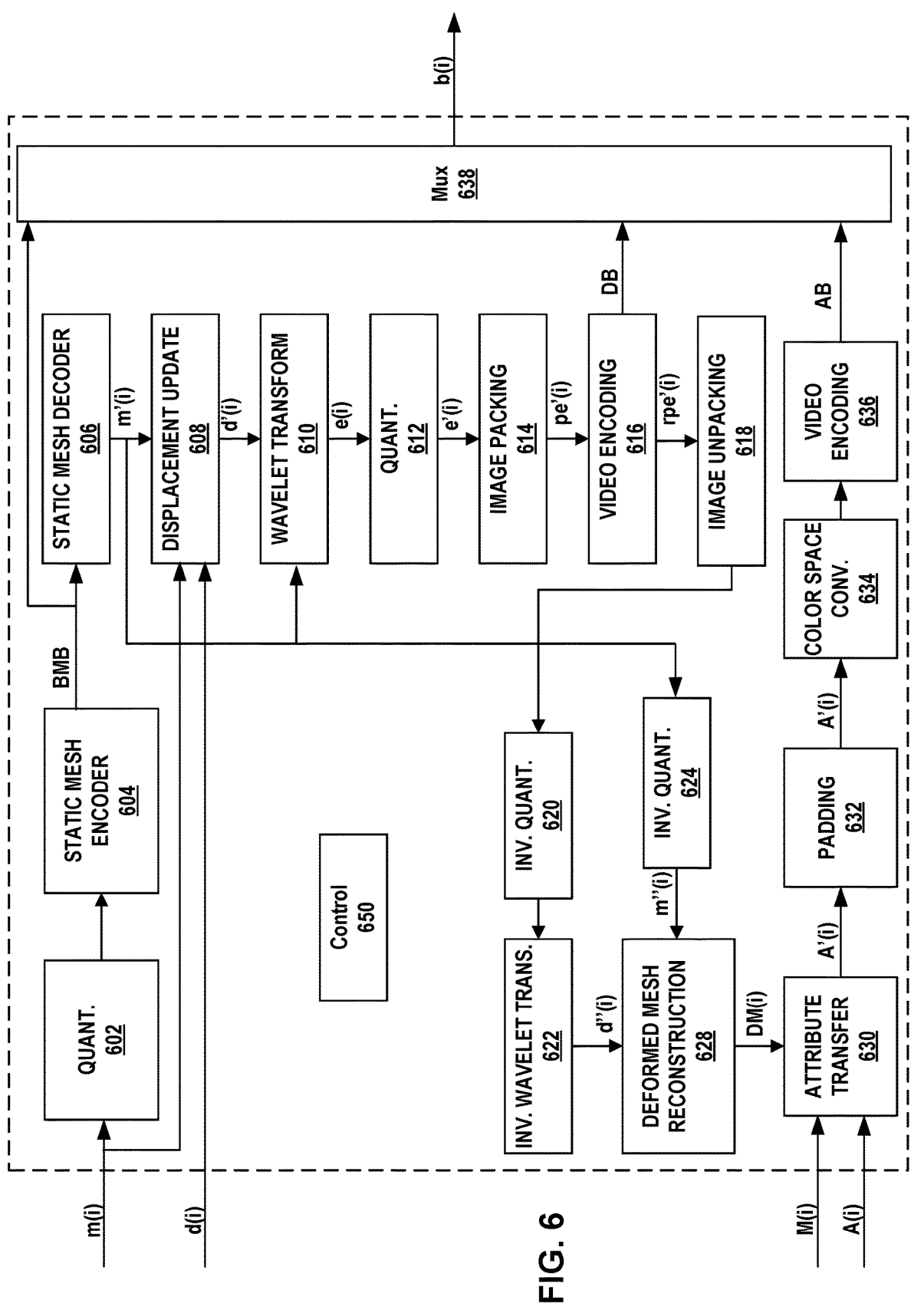
FIG. 6 shows an example of an intra frame encoder.

FIG. 6 includes the following abbreviations:

m(i)—Base mesh
d(i)—Displacements
m"(i)—Reconstructed Base Mesh
d"(i)—Reconstructed Displacements
A (i)—Attribute Map
A'(i)—Updated Attribute Map
M(i)—Static/Dynamic Mesh
DM(i)—Reconstructed Deformed Mesh
m'(i)—Reconstructed Quantized Base Mesh
d'(i)—Updated Displacements
e (i)—Wavelet Coefficients
e'(i)—Quantized Wavelet Coefficients
pe'(i)—Packed Quantized Wavelet Coefficients
rpe'(i)—Reconstructed Packed Quantized Wavelet Coefficients
AB—Compressed attribute bitstream
DB—Compressed displacement bitstream
BMB—Compressed base mesh bitstream V-DMC encoder 200 receives base mesh m(i) and displacements d(i), for example from pre-processing system 500 of FIG. 5. V-DMC encoder 200 also retrieves mesh M(i) and attribute map A (i).

Quantization unit 602 quantizes the base mesh, and static mesh encoder 604 encodes the quantized based mesh to generate a compressed base mesh bitstream.

Displacement update unit 608 uses the reconstructed quantized base mesh m'(i) to update the displacement field d(i) to generate an updated displacement field d'(i). This process considers the differences between the reconstructed base mesh m'(i) and the original base mesh m(i). By exploiting the subdivision surface mesh structure, wavelet transform unit 610 applies a wavelet transform to d'(i) to generate a set of wavelet coefficients. The scheme is agnostic of the transform applied and may leverage any other transform, including the identity transform. Quantization unit 612 quantizes wavelet coefficients, and image packing unit 614 packs the quantized wavelet coefficients into a 2D image/video that can be compressed using a traditional image/video encoder in the same spirit as V-PCC to generate a displacement bitstream.

Attribute transfer unit 630 converts the original attribute map A (i) to an updated attribute map that corresponds to the reconstructed deformed mesh DM(i). Padding unit 632 pads the updated attributed map by, for example, filling patches of the frame that have empty samples with interpolated samples that may improve coding efficiency and reduce artifacts. Color space conversion unit 634 converts the attribute map into a different color space, and video encoding unit 636 encodes the updated attribute map in the new color space, using for example a video codec, to generate an attribute bitstream.

Multiplexer 638 combines the compressed attribute bitstream, compressed displacement bitstream, and compressed base mesh bitstream into a single compressed bitstream.

Image unpacking unit 618 and inverse quantization unit 620 apply image unpacking and inverse quantization to the reconstructed packed quantized wavelet coefficients generated by video encoding unit 616 to obtain the reconstructed version of the wavelet coefficients. Inverse wavelet transform unit 622 applies and inverse wavelet transform to the reconstructed wavelet coefficient to determine reconstructed displacements d"(i).

Inverse quantization unit 624 applies an inverse quantization to the reconstructed quantized base mesh m'(i) to obtain a reconstructed base mesh m"(i). Deformed mesh reconstruction unit 628 subdivides m"(i) and applies the reconstructed displacements d"(i) to its vertices to obtain the reconstructed deformed mesh DM(i).

Image unpacking unit 618, inverse quantization unit 620, inverse wavelet transform unit 622, and deformed mesh reconstruction unit 628 represent a displacement decoding loop. Inverse quantization unit 624 and deformed mesh reconstruction unit 628 represent a base mesh decoding loop. Mesh encoder 600 includes the displacement decoding loop and the base mesh decoding loop so that mesh encoder 600 can make encoding decisions, such as determining an acceptable rate-distortion tradeoff, based on the same decoded mesh that a mesh decoder will generate, which may include distortion due to the quantization and transforms. Mesh encoder 600 may also use decoded versions of the base mesh, reconstructed mesh, and displacements for encoding subsequent base meshes and displacements.

Control unit 650 generally represents the decision making functionality of V-DMC encoder 200. During an encoding process, control unit 650 may, for example, make determinations with respect to mode selection, rate allocation, quality control, and other such decisions.

Figure 7:
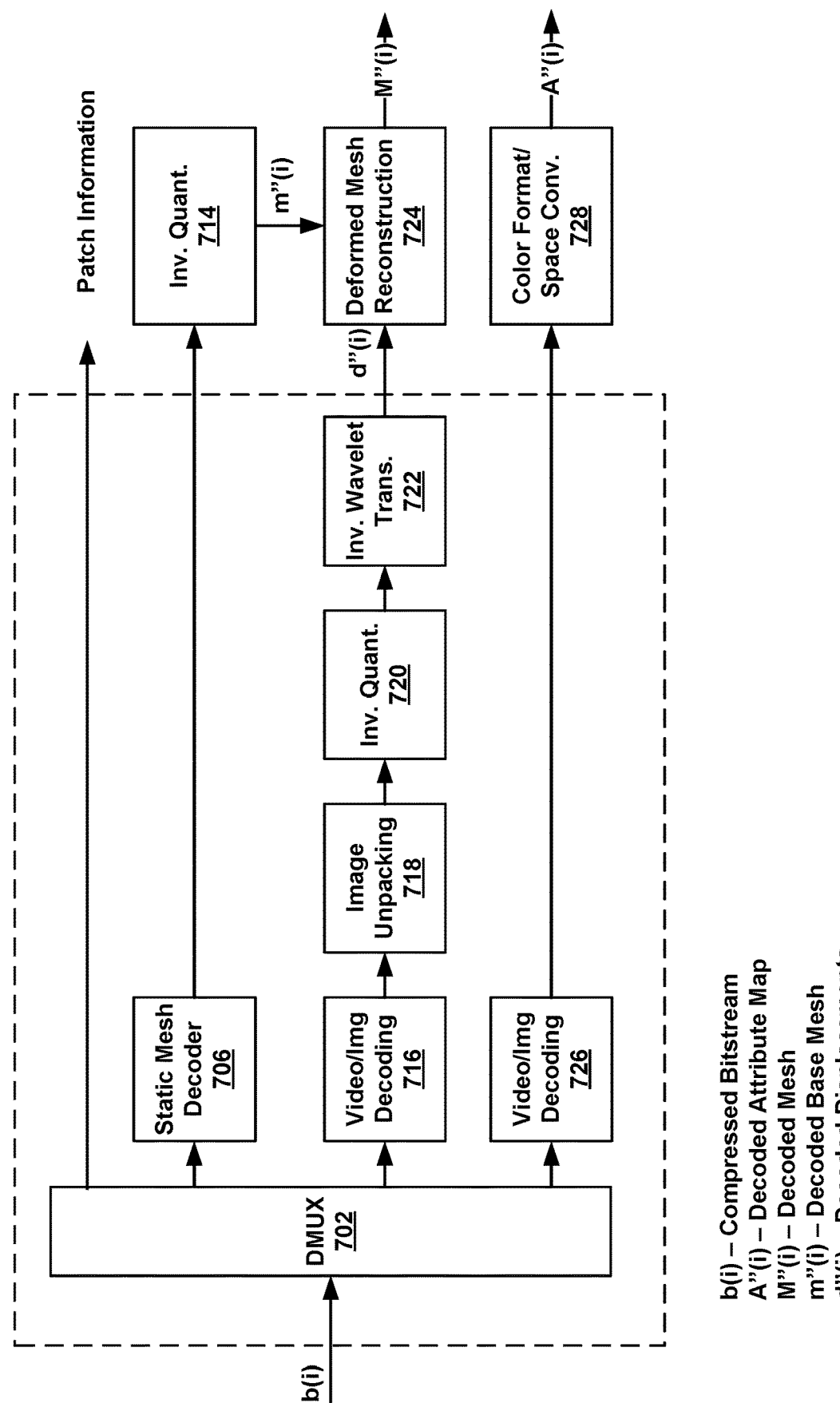
FIG. 7 shows an example of an intra frame decoder.

FIG. 7 shows a block diagram of an intra decoder which may, for example, be part of V-DMC decoder 300. De-multiplexer (DMUX) 702 separates compressed bitstream (bi) into a mesh sub-stream, a displacement sub-stream for positions and potentially for each vertex attribute, zero or more attribute map sub-streams, and an atlas sub-stream containing patch information in the same manner as in V3C/V-PCC.

De-multiplexer 702 feeds the mesh sub-stream to static mesh decoder 706 to generate the reconstructed quantized base mesh m'(i). Inverse quantization unit 714 inverse quantizes the base mesh to determine the decoded base mesh m"(i). Video/image decoding unit 716 decodes the displacement sub-stream, and image unpacking unit 718 unpacks the image/video to determine quantized transform coefficients, e.g., wavelet coefficients. Inverse quantization unit 720 inverse quantizes the quantized transform coefficients to determine dequantized transform coefficients. Inverse transform unit 722 generates the decoded displacement field d"(i) by applying the inverse transform to the unquantized coefficients. Deformed mesh reconstruction unit 724 generates the final decoded mesh (M"(i)) by applying the reconstruction process to the decoded base mesh m"(i) and by adding the decoded displacement field d"(i). The attribute sub-stream is directly decoded by video/image decoding unit 728 to generate an attribute map A"(i). Color format/space conversion unit may convert the attribute map into a different format or color space.

Figure 8:
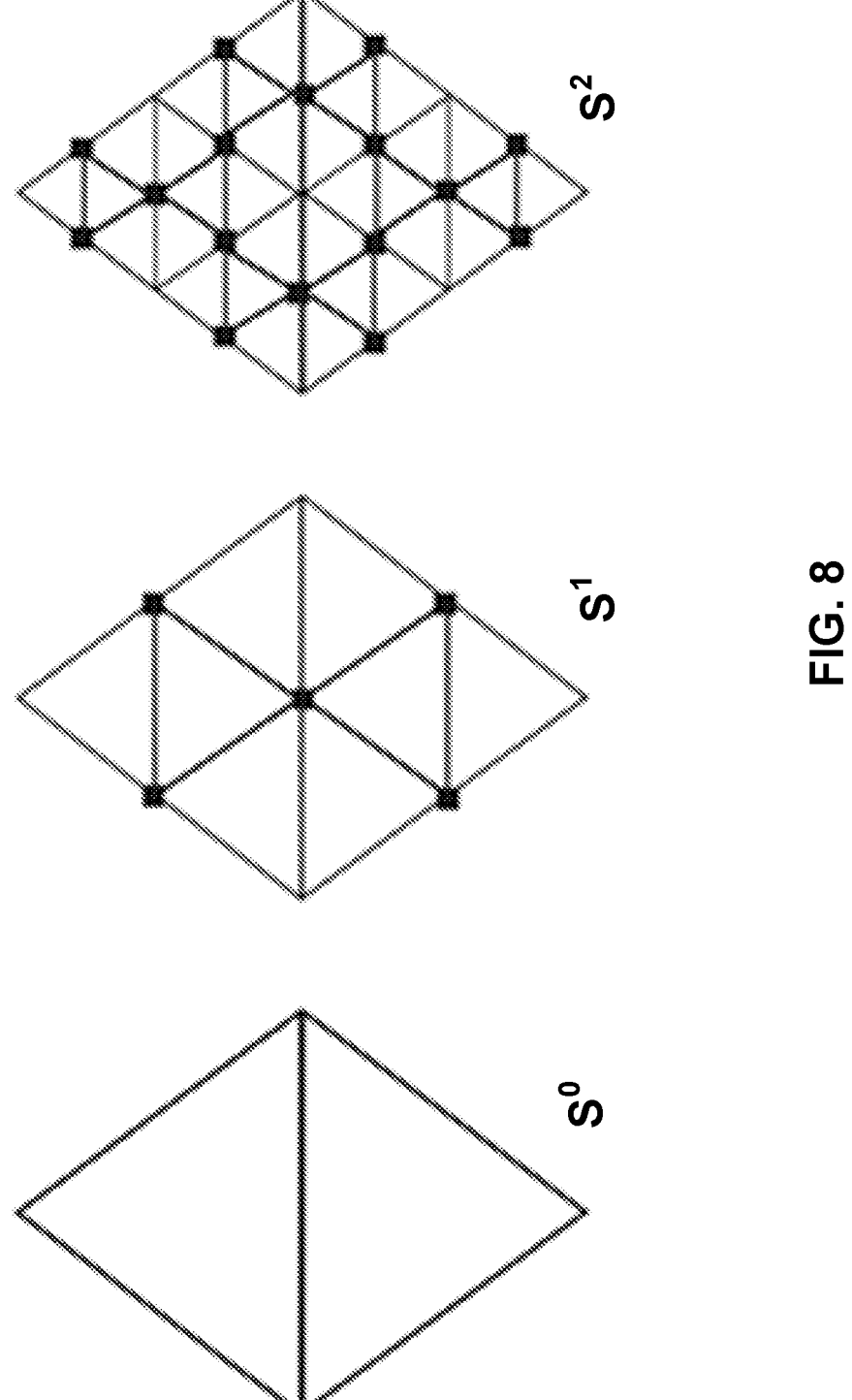
FIG. 8 shows an example of a mid-point subdivision scheme.

V-DMC encoder 200 and V-DMC decoder 300 may be configured to implement a subdivision scheme. Various subdivision schemes may be used. A possible solution is the mid-point subdivision scheme, which at each subdivision iteration subdivides each triangle into 4 sub-triangles as described in FIG. 8. New vertices are introduced in the middle of each edge. The subdivision process is applied independently to the geometry and to the texture coordinates since the connectivity for the geometry and for the texture coordinates is usually different. The sub-division scheme computes the position $Pos(v_{12})$ of a newly introduced vertex $v_{12}$ at the center of an edge $(v_1, v_2)$, as follows:

$$Pos(v_{12}) = \frac{1}{2}(Pos(v_1) + Pos(v_2)),$$

where $Pos(v_1)$ and $Pos(v_2)$ are the positions of the vertices $v_1$ and $v_2$.

The same process is used to compute the texture coordinates of the newly created vertex. For normal vectors, an extra normalization step is applied as follows:

$$N(v_{12}) = \frac{N(v_1) + N(v_2)}{\|N(v_1) + N(v_2)\|},$$

here:

$N(v_{12})$, $N(v_1)$, and $N(v_2)$ are the normal vectors associated with the vertices $v_2$, $v_1$, and $v_2$, respectively.

$\|x\|$ is the norm2 of the vector x.

V-DMC encoder 200 and V-DMC decoder 300 may be configured to apply wavelet transforms. Various wavelet transforms may be applied. The results reported for CfP are based on a linear wavelet transform.

The prediction process is defined as follows:

$$\text{Signal}(v) \leftarrow \text{Signal}(v) - \frac{1}{2}(\text{Signal}(v_1) + \text{Signal}(v_2))$$

where v is the vertex introduced in the middle of the edge $(v_1, v_2)$, and $\text{Signal}(v)$, $\text{Signal}(v_1)$, and $\text{Signal}(v_2)$ are the values of the geometry/vertex attribute signals at the vertices v, $v_1$, and $v_2$, respectively.

The update process is defined as follows:

$$\text{Signal}(v) \leftarrow \text{Signal}(v) + \frac{1}{8}\sum_{w \in v^*}\text{Signal}(w)$$

where v* is the set of neighboring vertices of the vertex v.

Note that the scheme allows to skip the update process. The wavelet coefficients may be quantized e.g., by using a uniform quantizer with a dead zone.

Local vs. Canonical Coordinate System for Displacements will now be discussed. The displacement field d(i) is defined in the same cartesian coordinate system as the input mesh. A possible optimization is to transform d(i) from this canonical coordinate system to a local coordinate system, which is defined by the normal to the subdivided mesh at each vertex.

A potential advantage of considering a local coordinate system for the displacements is the possibility to quantize more heavily the tangential components of the displacements compared to the normal component. In fact, the normal component of the displacement has more significant impact on the reconstructed mesh quality than the two tangential components.

V-DMC encoder 200 and V-DMC decoder 300 may be configured to implement packing of wavelet coefficients. The following scheme is used to pack the wavelet coefficients into a 2D image:

Traverse the coefficients from low to high frequency.

For each coefficient, determine the index of the N×M pixel block (e.g., N=M=16) in which it should be stored following a raster order for blocks.

The position within the N×M pixel block is computed by using a Morton order to maximize locality.

Other packing schemes may be used (e.g., zigzag order, raster order). The encoder may explicitly signal in the bitstream the used packing scheme (e.g., atlas sequence parameters). This may be done at patch, patch group, tile, or sequence level.

V-DMC encoder 200 may be configured to displacement video encoding. The proposed scheme is agnostic of which video coding technology is used. When coding the displacement wavelet coefficients, a lossless approach may be used since the quantization is applied in a separate module. Another approach is to rely on the video encoder to compress the coefficients in a lossy manner and apply a quantization either in the original or transform domain.

V-DMC encoder 200 and V-DMC decoder 300 may be configured to process a lifting transform parameter set and associated semantics, an example of which is shown in the table below.

| | Descriptor |
| --- | --- |
| vmc_lifting_transform_parameters( index, ltpIndex ){ | |
|    vmc_transform_lifting_skip_update_flag[index][ ltpIndex ] | u(1) |
|    vmc_transform_lifting_quantization_parameters_x[index][ ltpIndex ] | u(6) |
|    vmc_transform_lifting_quantization_parameters_y[index][ ltpIndex ] | u(6) |
|    vmc_transform_lifting_quantization_parameters_z[index][ ltpIndex ] | u(6) |
|    vmc_transform_log2_lifting_lod_inverse_scale_x[index][ ltpIndex ] | ue(v) |
|    vmc_transform_log2_lifting_lod_inverse_scale_y[index][ ltpIndex ] | ue(v) |
|    vmc_transform_log2_lifting_lod_inverse_scale_z[index][ ltpIndex ] | ue(v) |
|    vmc_transform_log2_lifting_update_weight[index][ ltpIndex ] | ue(v) |
|    vmc_transform_log2_lifting_prediction_weight[index][ ltpIndex ] | ue(v) |
| } | | syntax_element[i][ltpIndex] with i equal to 0 may be applied to the displacement. syntax_element[i][ltpIndex] with i equal to non-zero may be applied to the (i−1)-th attribute, where ltpIndex is the index of the lifting transform parameter set list.

vmc_transform_lifting_skip_update_flag[i][ltpIndex] equal to 1 indicates the step of the lifting transform applied to the displacement is skipped in the vmc_lifting_transform_parameters(index, lptIndex) syntax structure, where ltpIndex is the index of the lifting transform parameter set list. vmc_transform_lifting_skip_update_flag[i][ltpIndex] with i equal to 0 may be applied to the displacement. vmc_transform_lifting_skip_update_flag[i][ltpIndex] with i equal to non-zero may be applied to the (i−1)-th attribute.

vmc_transform_lifting_quantization_parameters_x[i][ltpIndex] indicates the quantization parameter to be used for the inverse quantization of the x-component of the displacements wavelets coefficients. The value of vmc_transform_lifting_quantization_parameters_x[index][ltpIndex] shall be in the range of 0 to 51, inclusive.

vmc_transform_lifting_quantization_parameters_y[i][ltpIndex] indicates the quantization parameter to be used for the inverse quantization of the y-component of the displacements wavelets coefficients. The value of vmc_transform_lifting_quantization_parameters_x[index][ltpIndex] shall be in the range of 0 to 51, inclusive.

vmc_transform_lifting_quantization_parameters_z[i][ltpIndex] indicates the quantization parameter to be used for the inverse quantization of the z-component of the displacements wavelets coefficients. The value of vmc_transform_lifting_quantization_parameters_x[index][ltpIndex] shall be in the range of 0 to 51, inclusive.

vmc_transform_log2_lifting_lod_inverse_scale_x[i][ltpIndex] indicates the scaling factor applied to the x-component of the displacements wavelets coefficients for each level of detail.

vmc_transform_log2_lifting_lod_inverse_scale_y[i][ltpIndex] indicates the scaling factor applied to the y-component of the displacements wavelets coefficients for each level of detail.

vmc_transform_log2_lifting_lod_inverse_scale_z[i][ltpIndex] indicates the scaling factor applied to the z-component of the displacements wavelets coefficients for each level of detail.

vmc_transform_log2_lifting_update_weight[i][ltpIndex] indicates the weighting coefficients used for the update filter of the wavelet transform.

vmc_transform_log2_lifting_prediction_weight[i][ltpIndex] the weighting coefficients used for the prediction filter of the wavelet transform.

V-DMC decoder 300 may be configured to perform inverse image packing of wavelet coefficients. Inputs to this process are:

width, which is a variable indicating the width of the displacements video frame, height, which is a variable indicating the height of the displacements video frame, bitDepth, which is a variable indicating the bit depth of the displacements video frame, dispQuantCoeffFrame, which is a 3D array of size width× height×3 indicating the packed quantized displacement wavelet coefficients.

blockSize, which is a variable indicating the size of the displacements coefficients blocks, positionCount, which is a variable indicating the number of positions in the subdivided submesh.

The output of this process is dispQuantCoeffArray, which is a 2D array of size positionCount×3 indicating the quantized displacement wavelet coefficients.

Let the function extracOddBits(x) be defined as follows:

```
x = extracOddBits( x ) {
    x = x & 0x55555555
    x = (x | (x >> 1)) & 0x33333333
    x = (x | (x >> 2)) & 0x0F0F0F0F
    x = (x | (x >> 4)) & 0x00FF00FF
    x = (x | (x >> 8)) & 0x0000FFFF
}
```

Let the function computeMorton2D(i) be defined as follows:

```
(x, y) = computeMorton2D( i ) {
    x = extracOddBits( i >> 1 )
    y = extracOddBits( i )
}
```

The wavelet coefficients inverse packing process proceeds as follows:

```
pixelsPerBlock = blockSize * blockSize
widthInBlocks = width / blockSize
shift = (1 << bitDepth) >> 1
for( v = 0; v < positionCount; v++ ) {
    blockIndex = v / pixelsPerBlock
    indexWithinBlock = v % pixelsPerBlock
    x0 = (blockIndex % widthInBlocks) * blockSize
    y0 = (blockIndex / widthInBlocks) * blockSize
    ( x, y ) = computeMorton2D(indexWithinBlock)
    x = x0 + x
    y = y0 + y
    for( d = 0; d < 3; d++ ) {
        dispQuantCoeffArray[ v ][ d ] = dispQuantCoeffFrame[ x ][ y ][ d ] – shift
    }
}
```

V-DMC decoder 300 may be configured to perform inverse quantization of wavelet coefficients. Inputs to this process are:

positionCount, which is a variable indicating the number of positions in the subdivided submesh.

dispQuantCoeffArray, which is a 2D array of size positionCount×3 indicating the quantized displacement wavelet coefficients.

subdivisionIterationCount, which is a variable indicating the number of subdivision iterations.

liftingQP, which is a 1D array of size 3 indicating the quantization parameter associated with the three displacement dimensions.

liftingLevelOfDetailInverseScale, which is a 1D array of size 3 indicating the inverse scale factor associated with the three displacement dimensions levelOfDetailAttributeCounts, a 1D array of size (subdivisionIterationCount+1) indicating the number of attributes associated with each subdivision iteration.

bitDepthPosition, which is a variable indicating the bit depth of the mesh positions, e.g., the bit depth of coordinates of the vertices.

The output of this process is dispCoeffArray, which is a 2D array of size positionCount×3 indicating the dequantized displacement wavelet coefficients.

The wavelet coefficients inverse quantization process proceeds as follows:

```
for ( d =0; d < 3; ++d) {
    qp = liftingQP[ d ]
    iscale[ d ] = qp >= 0 ? pow( 0.5, 16 – bitDepthPosition + ( 4 – qp ) / 6) : 0.0
    ilodScale[ d ] = liftingLevelOfDetailInverseScale[ d ]
}
vcount0 = 0
for( i = 0; i < subdivisionIterationCount; i++ ) {
    vcount1 = levelOfDetailAttributeCounts[ i ]
    for( v = vcount0; v < vcount1; v++ ) {
        for( d = 0; d < 3; d++ ) {
            dispCoeffArray[ v ][ d ] = dispQuantCoeffArray[ v ][ d ] * iscale[ k ]
        }
    }
    vcount0 = vcount1
    for( d = 0; d < 3; d++ ) {
        iscale[d] *= ilodScale[ d ]
    }
}
```

V-DMC decoder 300 may be configured to apply an inverse linear wavelet transform. Inputs to this process are: positionCount, which is a variable indicating the number of positions in the subdivided submesh.

dispCoeffArray, which is a 2D array of size position-Count×3 indicating the displacement wavelet coefficients.

levelOfDetailAttributeCounts, a 1D array of size (subdivisionIterationCount+1) indicating the number of attributes associated with each subdivision iteration.

edges, which is a 2D array of size positionCount×2 which indicates for each vertex v produced by the subdivision process described above, the two indices (a, b) of the two vertices used to generated it (i.e., v generated as the middle of the edge (a, b)).

updateWeight, which is a variable indicating the lifting update weight.

predWeight, which is a variable indicating the lifting prediction weight.

skipUpdate, which is a variable indicating whether the update operation should be skipped (when 1) or not (when 0).

The output of this process is dispArray, which is a 2D array of size positionCount×3 indicating the displacements to be applied to the mesh positions.

The inverse wavelet transform process proceeds as follows:

```
for( i = 0; i < subdivisionIterationCount; i++ ) {
    vcount0 = levelOfDetailAttributeCounts[i]
    vcount1 = levelOfDetailAttributeCounts[i + 1]
    for ( v = vcount0; skipUpdate == 0 && v < vcount1; ++v ) {
        a = edges[v][0]
        b = edges[v][1]
        for( d = 0; d < 3; d++ ) {
            disp = updateWeight * dispCoeffArray[v][d]
            signal[a][d] –= disp
            signal[b][d] –= disp
        }
    }
    for ( v = vcount0; skipUpdate == 0 && v < vcount1; ++v ) {
        a = edges[v][0]
        b = edges[v][1]
        for( d = 0; d < 3; d++ ) {
            dispCoeffArray[v][d] +=
                predWeight * (dispCoeffArray[a][d] +
            dispCoeffArray[b][d])
        }
    }
}
for ( v = 0; v < positionCount; ++v ) {
    for( d = 0; d < 3; d++ ) {
```

-continued

```
            dispArray[v][d] = dispCoeffArray[v][d]
        }
}
```

V-DMC decoder 300 may be configured to perform positions displacement. The inputs of this process are:

positionCount, which is a variable indicating the number of positions in the subdivided submesh.

positionsSubdiv, which is a 2D array of size position-Count×3 indicating the positions of the subdivided submesh.

dispArray, which is a 2D array of size positionCount×3 indicating the displacements to be applied to the mesh positions.

normals, which is a 2D array of size positionCount×3 indicating the normals to be used when applying the displacements to the submesh positions.

tangents, which is a 2D array of size positionCount×3 indicating the tangents to be used when applying the displacements to the submesh positions.

bitangents, which is a 2D array of size positionCount×3 indicating the tangents to be used when applying the displacements to the submesh positions.

The output of this process is positionsDisplaced, which is a 2D array of size positionCount×3 indicating the positions of the displaced subdivided submesh.

The positions displacement process proceeds as follows:

```
for ( v = 0; v < positionCount; ++v ) {
    for( d = 0; d < 3; d++ ) {
        positionsDisplaced[ v ][ d ] = positionsSubdiv[ v ][ d ] +
            dispArray[ v ][ 0 ] * normals[ v ][ d ] +
            dispArray[ v ][ 1 ] * tangents[ v ][ d ] +
            dispArray[ v ][ 2 ] * bitangents[ v ][ d ]
    }
}
```

As described above with respect to inverse quantization of wavelet coefficients, the inverse quantization scale to be applied to the component "d" wavelet coefficient is obtained based on the quantization parameter ("qp" or "QP" or "vmc_transform_lifting_quantization_parameters_x/y/z") using the following pseudocode formula:

$$iscale[d]=qp>=0?pow(0.5,16-bitDepthPosition+(4-qp)/6):0.0$$

Where bitDepthPosition is the bitdepth of the position coordinates.

Conversely, the forward quantization scale to be applied to the component "d" wavelet coefficient is obtained based on the quantization parameter using the following pseudo-code formula:

$$\text{scale}[d] = qp >= 0 \text{?pow}(2.0, 16 - \text{bitDepthPosition} + (4 - qp)/6):0.0$$

In general, the applied transform is not restricted to the wavelet transform (lifting) but can be any transform including the identity transform.

The following Table 1 enumerates scale and inverse scale (iScale) values obtained for various position bitdepths and quantization parameters. For example, it can be observed that the "lossless" quantization parameter is 4, or scale/iScale equals 1.0, for the bitdepth 16 while for bitdepth 8 it is 52. With every decrease of position bitdepth by 2, the QP value that corresponds to lossless quantization increases with 12 units. For example, for position bitdepth equal to 12 the lossless QP value equals 28, while it equals 40 for bitdepth 10, 52 for bitdepth 8, 64 for bitdepth 6, and so on.

TABLE 1

Scale and inverse scale values for various position bitdepths.

| scale | bitDepthPosition | | | | | bit DepthPosition | | | |
|---|---|---|---|---|---|---|---|---|---|
| QP | 8 | 10 | 12 | 16 | iScale | 8 | 10 | 12 | 16 |
| 0 | 406.37467 | 101.59367 | 25.39842 | 1.58740 | | 0.0025 | 0.0098 | 0.0394 | 0.6300 |
| 1 | 362.03867 | 90.50967 | 22.62742 | 1.41421 | | 0.0028 | 0.0110 | 0.0442 | 0.7071 |
| 2 | 322.53979 | 80.63495 | 20.15874 | 1.25992 | | 0.0031 | 0.0124 | 0.0496 | 0.7937 |
| 3 | 287.35028 | 71.83757 | 17.95939 | 1.12246 | | 0.0035 | 0.0139 | 0.0557 | 0.8909 |
| 4 | 256.00000 | 64.00000 | 16.00000 | 1.00000 | | 0.0039 | 0.0156 | 0.0625 | 1.0000 |
| 5 | 228.07007 | 57.01752 | 14.25438 | 0.89090 | | 0.0044 | 0.0175 | 0.0702 | 1.1225 |
| 6 | 203.18733 | 50.79683 | 12.69921 | 0.79370 | | 0.0049 | 0.0197 | 0.0787 | 1.2599 |
| 7 | 181.01934 | 45.25483 | 11.31371 | 0.70711 | | 0.0055 | 0.0221 | 0.0884 | 1.4142 |
| 8 | 161.26989 | 40.31747 | 10.07937 | 0.62996 | | 0.0062 | 0.0248 | 0.0992 | 1.5874 |
| 9 | 143.67514 | 35.91879 | 8.97970 | 0.56123 | | 0.0070 | 0.0278 | 0.1114 | 1.7818 |
| 10 | 128.00000 | 32.00000 | 8.00000 | 0.50000 | | 0.0078 | 0.0313 | 0.1250 | 2.0000 |
| 11 | 114.03504 | 28.50876 | 7.12719 | 0.44545 | | 0.0088 | 0.0351 | 0.1403 | 2.2449 |
| 12 | 101.59367 | 25.39842 | 6.34960 | 0.39685 | | 0.0098 | 0.0394 | 0.1575 | 2.5198 |
| 13 | 90.50967 | 22.62742 | 5.65685 | 0.35355 | | 0.0110 | 0.0442 | 0.1768 | 2.8284 |
| 14 | 80.63495 | 20.15874 | 5.03968 | 0.31498 | | 0.0124 | 0.0496 | 0.1984 | 3.1748 |
| 15 | 71.83757 | 17.95939 | 4.48985 | 0.28062 | | 0.0139 | 0.0557 | 0.2227 | 3.5636 |
| 16 | 64.00000 | 16.00000 | 4.00000 | 0.25000 | | 0.0156 | 0.0625 | 0.2500 | 4.0000 |
| 17 | 57.01752 | 14.25438 | 3.56359 | 0.22272 | | 0.0175 | 0.0702 | 0.2806 | 4.4898 |
| 18 | 50.79683 | 12.69921 | 3.17480 | 0.19843 | | 0.0197 | 0.0787 | 0.3150 | 5.0397 |
| 19 | 45.25483 | 11.31371 | 2.82843 | 0.17678 | | 0.0221 | 0.0884 | 0.3536 | 5.6569 |
| 20 | 40.31747 | 10.07937 | 2.51984 | 0.15749 | | 0.0248 | 0.0992 | 0.3969 | 6.3496 |
| 21 | 35.91879 | 8.97970 | 2.24492 | 0.14031 | | 0.0278 | 0.1114 | 0.4454 | 7.1272 |
| 22 | 32.00000 | 8.00000 | 2.00000 | 0.12500 | | 0.0313 | 0.1250 | 0.5000 | 8.0000 |
| 23 | 28.50876 | 7.12719 | 1.78180 | 0.11136 | | 0.0351 | 0.1403 | 0.5612 | 8.9797 |
| 24 | 25.39842 | 6.34960 | 1.58740 | 0.09921 | | 0.0394 | 0.1575 | 0.6300 | 10.0794 |
| 25 | 22.62742 | 5.65685 | 1.41421 | 0.08839 | | 0.0442 | 0.1768 | 0.7071 | 11.3137 |
| 26 | 20.15874 | 5.03968 | 1.25992 | 0.07875 | | 0.0496 | 0.1984 | 0.7937 | 12.6992 |
| 27 | 17.95939 | 4.48985 | 1.12246 | 0.07015 | | 0.0557 | 0.2227 | 0.8909 | 14.2544 |
| 28 | 16.00000 | 4.00000 | 1.00000 | 0.06250 | | 0.0625 | 0.2500 | 1.0000 | 16.0000 |
| 29 | 14.25438 | 3.56359 | 0.89090 | 0.05568 | | 0.0702 | 0.2806 | 1.1225 | 17.9594 |
| 30 | 12.69921 | 3.17480 | 0.79370 | 0.04961 | | 0.0787 | 0.3150 | 1.2599 | 20.1587 |
| 31 | 11.31371 | 2.82843 | 0.70711 | 0.04419 | | 0.0884 | 0.3536 | 1.4142 | 22.6274 |
| 32 | 10.07937 | 2.51984 | 0.62996 | 0.03937 | | 0.0992 | 0.3969 | 1.5874 | 25.3984 |
| 33 | 8.97970 | 2.24492 | 0.56123 | 0.03508 | | 0.1114 | 0.4454 | 1.7818 | 28.5088 |
| 34 | 8.00000 | 2.00000 | 0.50000 | 0.03125 | | 0.1250 | 0.5000 | 2.0000 | 32.0000 |
| 35 | 7.12719 | 1.78180 | 0.44545 | 0.02784 | | 0.1403 | 0.5612 | 2.2449 | 35.9188 |
| 36 | 6.34960 | 1.58740 | 0.39685 | 0.02480 | | 0.1575 | 0.6300 | 2.5198 | 40.3175 |
| 37 | 5.65685 | 1.41421 | 0.35355 | 0.02210 | | 0.1768 | 0.7071 | 2.8284 | 45.2548 |
| 38 | 5.03968 | 1.25992 | 0.31498 | 0.01969 | | 0.1984 | 0.7937 | 3.1748 | 50.7968 |
| 39 | 4.48985 | 1.12246 | 0.28062 | 0.01754 | | 0.2227 | 0.8909 | 3.5636 | 57.0175 |
| 40 | 4.00000 | 1.00000 | 0.25000 | 0.01563 | | 0.2500 | 1.0000 | 4.0000 | 64.0000 |
| 41 | 3.56359 | 0.89090 | 0.22272 | 0.01392 | | 0.2806 | 1.1225 | 4.4898 | 71.8376 |
| 42 | 3.17480 | 0.79370 | 0.19843 | 0.01240 | | 0.3150 | 1.2599 | 5.0397 | 80.6349 |
| 43 | 2.82843 | 0.70711 | 0.17678 | 0.01105 | | 0.3536 | 1.4142 | 5.6569 | 90.5097 |
| 44 | 2.51984 | 0.62996 | 0.15749 | 0.00984 | | 0.3969 | 1.5874 | 6.3496 | 101.5937 |
| 45 | 2.24492 | 0.56123 | 0.14031 | 0.00877 | | 0.4454 | 1.7818 | 7.1272 | 114.0350 |
| 46 | 2.00000 | 0.50000 | 0.12500 | 0.00781 | | 0.5000 | 2.0000 | 8.0000 | 128.0000 |
| 47 | 1.78180 | 0.44545 | 0.11136 | 0.00696 | | 0.5612 | 2.2449 | 8.9797 | 143.6751 |
| 48 | 1.58740 | 0.39685 | 0.09921 | 0.00620 | | 0.6300 | 2.5198 | 10.0794 | 161.2699 |
| 49 | 1.41421 | 0.35355 | 0.08839 | 0.00552 | | 0.7071 | 2.8284 | 11.3137 | 181.0193 |
| 50 | 1.25992 | 0.31498 | 0.07875 | 0.00492 | | 0.7937 | 3.1748 | 12.6992 | 203.1873 |
| 51 | 1.12246 | 0.28062 | 0.07015 | 0.00438 | | 0.8909 | 3.5636 | 14.2544 | 228.0701 |
| 52 | 1.00000 | 0.25000 | 0.06250 | 0.00391 | | 1.0000 | 4.0000 | 16.0000 | 256.0000 |
| 53 | 0.89090 | 0.22272 | 0.05568 | 0.00348 | | 1.1225 | 4.4898 | 17.9594 | 287.3503 |
| 54 | 0.79370 | 0.19843 | 0.04961 | 0.00310 | | 1.2599 | 5.0397 | 20.1587 | 322.5398 |
| 55 | 0.70711 | 0.17678 | 0.04419 | 0.00276 | | 1.4142 | 5.6569 | 22.6274 | 362.0387 |
| 56 | 0.62996 | 0.15749 | 0.03937 | 0.00246 | | 1.5874 | 6.3496 | 25.3984 | 406.3747 |
| 57 | 0.56123 | 0.14031 | 0.03508 | 0.00219 | | 1.7818 | 7.1272 | 28.5088 | 456.1401 |
| 58 | 0.50000 | 0.12500 | 0.03125 | 0.00195 | | 2.0000 | 8.0000 | 32.0000 | 512.0000 |
| 59 | 0.44545 | 0.11136 | 0.02784 | 0.00174 | | 2.2449 | 8.9797 | 35.9188 | 574.7006 |
| 60 | 0.39685 | 0.09921 | 0.02480 | 0.00155 | | 2.5198 | 10.0794 | 40.3175 | 645.0796 |

TABLE 1-continued

Scale and inverse scale values for various position bitdepths.

| scale | bitDepthPosition | | | | | bit DepthPosition | | | |
|---|---|---|---|---|---|---|---|---|---|
| QP | 8 | 10 | 12 | 16 | iScale | 8 | 10 | 12 | 16 |
| 61 | 0.35355 | 0.08839 | 0.02210 | 0.00138 | | 2.8284 | 11.3137 | 45.2548 | 724.0773 |
| 62 | 0.31498 | 0.07875 | 0.01969 | 0.00123 | | 3.1748 | 12.6992 | 50.7968 | 812.7493 |
| 63 | 0.28062 | 0.07015 | 0.01754 | 0.00110 | | 3.5636 | 14.2544 | 57.0175 | 912.2803 |
| 64 | 0.25000 | 0.06250 | 0.01563 | 0.00098 | | 4.0000 | 16.0000 | 64.0000 | 1024.0000 |
| 65 | 0.22272 | 0.05568 | 0.01392 | 0.00087 | | 4.4898 | 17.9594 | 71.8376 | 1149.4011 |
| 66 | 0.19843 | 0.04961 | 0.01240 | 0.00078 | | 5.0397 | 20.1587 | 80.6349 | 1290.1592 |
| 67 | 0.17678 | 0.04419 | 0.01105 | 0.00069 | | 5.6569 | 22.6274 | 90.5097 | 1448.1547 |
| 68 | 0.15749 | 0.03937 | 0.00984 | 0.00062 | | 6.3496 | 25.3984 | 101.5937 | 1625.4987 |
| 69 | 0.14031 | 0.03508 | 0.00877 | 0.00055 | | 7.1272 | 28.5088 | 114.0350 | 1824.5606 |
| 70 | 0.12500 | 0.03125 | 0.00781 | 0.00049 | | 8.0000 | 32.0000 | 128.0000 | 2048.0000 |
| 71 | 0.11136 | 0.02784 | 0.00696 | 0.00044 | | 8.9797 | 35.9188 | 143.6751 | 2298.8023 |
| 72 | 0.09921 | 0.02480 | 0.00620 | 0.00039 | | 10.0794 | 40.3175 | 161.2699 | 2580.3183 |
| 73 | 0.08839 | 0.02210 | 0.00552 | 0.00035 | | 11.3137 | 45.2548 | 181.0193 | 2896.3094 |
| 74 | 0.07875 | 0.01969 | 0.00492 | 0.00031 | | 12.6992 | 50.7968 | 203.1873 | 3250.9974 |
| 75 | 0.07015 | 0.01754 | 0.00438 | 0.00027 | | 14.2544 | 57.0175 | 228.0701 | 3649.1211 |
| 76 | 0.06250 | 0.01563 | 0.00391 | 0.00024 | | 16.0000 | 64.0000 | 256.0000 | 4096.0000 |
| 77 | 0.05568 | 0.01392 | 0.00348 | 0.00022 | | 17.9594 | 71.8376 | 287.3503 | 4597.6045 |
| 78 | 0.04961 | 0.01240 | 0.00310 | 0.00019 | | 20.1587 | 80.6349 | 322.5398 | 5160.6366 |
| 79 | 0.04419 | 0.01105 | 0.00276 | 0.00017 | | 22.6274 | 90.5097 | 362.0387 | 5792.6188 |
| 80 | 0.03937 | 0.00984 | 0.00246 | 0.00015 | | 25.3984 | 101.5937 | 406.3747 | 6501.9947 |
| 81 | 0.03508 | 0.00877 | 0.00219 | 0.00014 | | 28.5088 | 114.0350 | 456.1401 | 7298.2423 |
| 82 | 0.03125 | 0.00781 | 0.00195 | 0.00012 | | 32.0000 | 128.0000 | 512.0000 | 8192.0000 |
| 83 | 0.02784 | 0.00696 | 0.00174 | 0.00011 | | 35.9188 | 143.6751 | 574.7006 | 9195.2091 |
| 84 | 0.02480 | 0.00620 | 0.00155 | 0.00010 | | 40.3175 | 161.2699 | 645.0796 | 10321.2732 |
| 85 | 0.02210 | 0.00552 | 0.00138 | 0.00009 | | 45.2548 | 181.0193 | 724.0773 | 11585.2375 |
| 86 | 0.01969 | 0.00492 | 0.00123 | 0.00008 | | 50.7968 | 203.1873 | 812.7493 | 13003.9894 |
| 87 | 0.01754 | 0.00438 | 0.00110 | 0.00007 | | 57.0175 | 228.0701 | 912.2803 | 14596.4846 |
| 88 | 0.01563 | 0.00391 | 0.00098 | 0.00006 | | 64.0000 | 256.0000 | 1024.0000 | 16384.0000 |
| 89 | 0.01392 | 0.00348 | 0.00087 | 0.00005 | | 71.8376 | 287.3503 | 1149.4011 | 18390.4182 |
| 90 | 0.01240 | 0.00310 | 0.00078 | 0.00005 | | 80.6349 | 322.5398 | 1290.1592 | 20642.5465 |
| 91 | 0.01105 | 0.00276 | 0.00069 | 0.00004 | | 90.5097 | 362.0387 | 1448.1547 | 23170.4750 |
| 92 | 0.00984 | 0.00246 | 0.00062 | 0.00004 | | 101.5937 | 406.3747 | 1625.4987 | 26007.9788 |
| 93 | 0.00877 | 0.00219 | 0.00055 | 0.00003 | | 114.0350 | 456.1401 | 1824.5606 | 29192.9692 |
| 94 | 0.00781 | 0.00195 | 0.00049 | 0.00003 | | 128.0000 | 512.0000 | 2048.0000 | 32768.0000 |
| 95 | 0.00696 | 0.00174 | 0.00044 | 0.00003 | | 143.6751 | 574.7006 | 2298.8023 | 36780.8364 |
| 96 | 0.00620 | 0.00155 | 0.00039 | 0.00002 | | 161.2699 | 645.0796 | 2580.3183 | 41285.0930 |
| 97 | 0.00552 | 0.00138 | 0.00035 | 0.00002 | | 181.0193 | 724.0773 | 2896.3094 | 46340.9500 |
| 98 | 0.00492 | 0.00123 | 0.00031 | 0.00002 | | 203.1873 | 812.7493 | 3250.9974 | 52015.9577 |
| 99 | 0.00438 | 0.00110 | 0.00027 | 0.00002 | | 228.0701 | 912.2803 | 3649.1211 | 58385.9384 |
| 100 | 0.00391 | 0.00098 | 0.00024 | 0.00002 | | 256.0000 | 1024.0000 | 4096.0000 | 65536.0000 |

The quantization process used to quantize (forward/inverse) the coefficients of the displacement vector components after transform has following shortcomings:

The quantization parameter (QP) is in the range of 0 to 51 (as described above with respect to lifting transform parameter set and semantics), which restricts the quantization of large coefficients depending on maximum position bitdepth. For example, the maximum iScale value is only 14.25 in case of bitdepth 12. Conversely, for small position bitdepths such as 8 the lossless QP or iScale value 1.0 is unavailable. This means that for bitdepth 8 only scale values are available that upscale the coefficient values or equivalently scale values that increase the precision of the coefficients in floating point arithmetic.

Although the quantization formulas do not restrict the position coordinate bitdepth, in practice the position coordinate bitdepth is restricted to maximum of 16 bits by the quantization process formulas, because for bitdepths larger than 16 the lossless scaling value 1.0 is unavailable. At the same time, the maximum position bitdepth value that can be signaled appears to be 32 according to the WD 2.0 V3C parameter set vmesh extension syntax:

"vps_ext_mesh_attribute_bitdepth_minus1[j][i] indicates the bit depth of the i-th attribute for the atlas with atlas ID j. vps_ext_mesh_attribute_bitdepth_minus1[j] shall be in the range of 0 to 31, inclusive."

In case of large QP values or, equivalently, large inverse scaling factor, the reconstructed position coordinates may exceed the maximum position bitdepth. This may occur in case of a rogue bitstream that signals large, quantized wavelet coefficients.

In addition, the ilodScale factor (liftingLevelOfDetailInverseScale or vmc_transform_log2_lifting_lod_inverse_scale_x/y/z) may further increase the scaling factor with increasing level of detail (as described with respect to inverse quantization of wavelet coefficients). There is no restriction on its value.

The quantization scale formulas are designed so that the inverse scale doubles in value with every increase of 6 units in quantization parameter. For certain applications, this may be restrictive and additional units are required or fewer units.

V-DMC encoder 200 and V-DMC decoder 300 may be configured to utilize an extended QP range. Given the current quantization scale formulas (floating point precision) in WD 2.0 per displacement dimension:

$$\text{iscale}[d] = qp >= 0?\text{pow}(0.5, 16 - \text{bitDepthPosition} + (4 - qp)/6):0.0$$

$$\text{scale}[d] = qp >= 0?\text{pow}(2.0, 16 - \text{bitDepthPosition} + (4 - qp)/6):0.0$$

The current QP range 0 . . . 51 is extended to the range 0 . . . 100. The value 100 is determined as follows. Given a position bitdepth B and given that the position coordinates are signed integer values, the maximum positive value is equal to (pow(2,B−1)−1) while the smallest negative value is −(pow(2,B−1)), where the function pow(M,E) represents M to the power E. For example, for bitdepth B equal to 16, the range of values is −32768 . . . 32767. From Table 1, it can be determined that for a given bitdepth the scale value corresponding with QP equal to 100 may be such that when a value is quantized with this scale value, it may be rounded to integer 0. For example, in case of bitdepth 16 the value range −32768 . . . 32767 may be quantized to the range −0.5 . . . 0.499 and after rounding to integer with typical function floor(x+0.5) the value 0 is obtained. In some examples, the current QP range can be extended to the range 0 . . . 99 or a maximum QP value near 100.

Similarly, to mitigate the problem that for lower bitdepths such as 8 the lossless scale factor 1.0 is unavailable for the current QP range 0 . . . 51, the QP range requires extension. For example, to include the lossless scale for bitdepth 8, the QP range needs extension to at least 0 . . . 52. In another example, to include the lossless scale for bitdepth 6, the QP range needs to be extended to at least 0 . . . 64. However, these ranges are insufficiently large, because all scale values within these ranges would correspond with upscaling the coefficients or equivalently increasing the coefficient values. Therefore, the QP range 0 . . . 100 would include scale values that quantize the coefficient values.

V-DMC encoder 200 and V-DMC decoder 300 may be configured for extended position bitdepth support. Given the current quantization scale formulas (floating point precision) in WD2.0 per displacement dimension:

$$iscale[d]=qp>=0?pow(0.5,16-bitDepthPosition+(4-qp)/6):0.0$$

$$scale[d]=qp>=0?pow(2.0,16-bitDepthPosition+(4-qp)/6):0.0$$

The value 16 in the formulas is a constant that influences what maximum position bitdepth has useful scale factors as enumerated in Table 1. For example, in case the bitdepth exceeds 16 the lossless scale value 1.0 may be unavailable as explained above. To support higher position bitdepths the or equivalent. The bit depth offset value may be use in conjunction with the default value (in this case 16) as follows:

$$iscale[d]=qp>=0?pow(0.5,16+<<offset>>-bitDepthPosition+(4-qp)/6):0.0$$

$$scale[d]=qp>=0?pow(2.0,16+<<offset>>-bitDepthPosition+(4-qp)/6):0.0$$

In some examples, the "bitDepthPosition" variable may be modified into the "bitDepthDisplacement" variable, indicating the maximum bitdepth of the displacement vector coefficients after transform (incl. identity), as described above. In this case the bitdepth only corresponds with the data per displacement dimension that is going through the quantization process, as follows:

$$iscale[d]=qp>=0?pow(0.5,16+<<offset>>-bitDepthDisplacement+(4-qp)/6):0.0$$

$$scale[d]=qp>=0?pow(2.0,16+<<offset>>-bitDepthDisplacement+(4-qp)/6):0.0$$

Or without the offset variable:

$$iscale[d]=qp>=0?pow(0.5,16-bitDepthDisplacement+(4-qp)/6):0.0$$

$$scale[d]=qp>=0?pow(2.0,16-bitDepthDisplacement+(4-qp)/6):0.0$$

The displacement vector component bitdepth variable "bitDepthDisplacement" may be signaled in the bitstream, for example, in the sequence parameter set.

V-DMC encoder 200 and V-DMC decoder 300 may be configured to implement a level of detail scaling factor restriction.

The ilodScale factor (liftingLevelOfDetailInverseScale or vmc_transform_log2_lifting_lod_inverse_scale_x/y/z) may further modify the inverse scaling factor with increasing level of detail (as described above with respect to inverse quantization of wavelet coefficients). There is no restriction on its value range in WD 2.0 besides that it is signaled in the bitstream as an unsigned integer, which means that the inverse scale can remain the same (value 0) or increase (value greater than 0):

"liftingLevelOfDetailInverseScale" is a 1D array of size 3 indicating the inverse scale factor associated with the three displacement dimensions.

| | Descriptor |
|---|---|
| vmc_lifting_transform_parameters( index, ltpIndex ){ | |
|    vmc_transform_lifting_skip_update_flag[index][ ltpIndex ] | u(1) |
|    vmc_transform_lifting_quantization_parameters_x[index][ ltpIndex ] | u(6) |
|    vmc_transform_lifting_quantization_parameters_y[index][ ltpIndex ] | u(6) |
|    vmc_transform_lifting_quantization_parameters_z[index][ ltpIndex ] | u(6) |
|    vmc_transform_log2_lifting_lod_inverse_scale_x[index][ ltpIndex ] | ue(v) |
|    vmc_transform_log2_lifting_lod_inverse_scale_y[index][ ltpIndex ] | ue(v) |
|    vmc_transform_log2_lifting_lod_inverse_scale_z[index][ ltpIndex ] | ue(v) |
|    vmc_transform_log2_lifting_update_weight[index][ ltpIndex ] | ue(v) |
|    vmc_transform_log2_lifting_prediction_weight[index][ ltpIndex ] | ue(v) |
| } | | value 16 would need to be increased. For example, for bitdepth 20 the value should be adjusted to at least value 20. This way the lossless scale 1.0 would be included. The modified value may be signaled in the bitstream, for example, in a sequence parameter set or equivalent. In some examples, a signed or unsigned integer offset value, also referred to herein as a bit depth offset value, shown between << >> below, may be signaled in a sequence parameter set vmc_transform_log2_lifting_lod_inverse_scale_x[i][ltpIndex] indicates the scaling factor applied to the x-component of the displacements wavelets coefficients for each level of detail.

vmc_transform_log2_lifting_lod_inverse_scale_y[i][ltpIndex] indicates the scaling factor applied to the y-component of the displacements wavelets coefficients for each level of detail.

vmc_transform_log2_lifting_lod_inverse_scale_z[i][ltpIndex] indicates the scaling factor applied to the z-component of the displacements wavelets coefficients for each level of detail.

syntax_element[i][ltpIndex] with i equal to 0 may be applied to the displacement. syntax_element[i][ltpIndex] with i equal to non-zero may be applied to the (i−1)-th attribute, where ltpIndex is the index of the lifting transform parameter set list.

A potential benefit of restricting the LoD scaling factor is a reduced number of decoder conformance testing required, for example, fewer test bitstreams, etc. In this disclosure, it is proposed to have a maximum value for the LoD inverse scaling factor, for example value 8 (u(2) indicates unsigned 2-bit integer with max value 3=>2^3):

|  | Descriptor |
| --- | --- |
| vmc_lifting_transform_parameters( index, ltpIndex ){ |  |
|     vmc_transform_lifting_skip_update_flag[index][ ltpIndex ] | u(1) |
|     vmc_transform_lifting_quantization_parameters_x[index][ ltpIndex ] | u(6) |
|     vmc_transform_lifting_quantization_parameters_y[index][ ltpIndex ] | u(6) |
|     vmc_transform_lifting_quantization_parameters_z[index][ ltpIndex ] | u(6) |
|     vmc_transform_log2_lifting_lod_inverse_scale_x[index][ ltpIndex ] | u(2) |
|     vmc_transform_log2_lifting_lod_inverse_scale_y[index][ ltpIndex ] | u(2) |
|     vmc_transform_log2_lifting_lod_inverse_scale_z[index][ ltpIndex ] | u(2) |
|     vmc_transform_log2_lifting_update_weight[index][ ltpIndex ] | ue(v) |
|     vmc_transform_log2_lifting_prediction_weight[index][ ltpIndex ] | ue(v) |
| } |  |

Potentially, this maximum value may be dependent on the number of level of details. For example, a LoD scaling factor value may be signaled separately per LoD. For example, in WD 2.0:

"subdivisionIterationCount" is a variable indicating the number of subdivision iterations.

asps_vmc_ext_subdivision_iteration_count indicates the number of iterations used for the subdivision. When not present the value of asps_vmc_ext_subdivision_iteration_count is inferred to be equal to 0.

|  | Descriptor |
| --- | --- |
| vmc_lifting_transform_parameters( index, ltpIndex ){ |  |
|   vmc_transform_lifting_skip_update_flag[index][ ltpIndex ] | u(1) |
|   vmc_transform_lifting_quantization_parameters_x[index][ ltpIndex ] | u(6) |
|   vmc_transform_lifting_quantization_parameters_y[index][ ltpIndex ] | u(6) |
|   vmc_transform_lifting_quantization_parameters_z[index][ ltpIndex ] | u(6) |
|     for(i=0; i< asps_vmc_ext_subdivision_iteration_count; i++){ |  |
|       vmc_transform_log2_lifting_lod_inverse_scale_x[index][ ltpIndex ][ i ] | ue(v) or u(2) |
|       vmc_transform_log2_lifting_lod_inverse_scale_y[index][ ltpIndex ][ i ] | ue(v) or u(2) |
|       vmc_transform_log2_lifting_lod_inverse_scale_z[index][ ltpIndex ][ i ] | ue(v) or u(2) |
|     } |  |
|   vmc_transform_log2_lifting_update_weight[index][ ltpIndex ] | ue(v) |
|   vmc_transform_log2_lifting_prediction_weight[index][ ltpIndex ] | ue(v) |
| } |  |

In some examples, quantization parameters can be signaled per level of detail, in place of the scale values.

|  | Descriptor |
| --- | --- |
| vmc_lifting_transform_parameters( index, ltpIndex ){ |  |
| vmc_transform_lifting_skip_update_flag[index][ ltpIndex ] | u(1) |
|     for(i=0; i< asps_vmc_ext_subdivision_iteration_count; i++){ |  |
|   vmc_transform_lifting_quantization_parameters_x[index][ ltpIndex ][ i ] | u(6) |
|   vmc_transform_lifting_quantization_parameters_y[index][ ltpIndex ][ i ] | u(6) |
|   vmc_transform_lifting_quantization_parameters_z[index][ ltpIndex ][ i ] | u(6) |
|     } |  |
| vmc_transform_log2_lifting_update_weight[index][ ltpIndex ] | ue(v) |
| vmc_transform_log2_lifting_prediction_weight[index][ ltpIndex ] | ue(v) |
| } |  |

In some examples, quantization parameters may be signaled separately for LODs in addition to the base QP signaled for lifting (i.e., vmc_transform_lifting_quantization_parameters_x/y/z). The syntax table may be as follows:

| | Descriptor |
|---|---|
| vmc_lifting_transform_parameters( index, ltpIndex ){ | |
|    vmc_transform_lifting_skip_update_flag[index][ ltpIndex ] | u(1) |
|    vmc_transform_lifting_quantization_parameters_x[index][ ltpIndex ] | u(6) |
|    vmc_transform_lifting_quantization_parameters_y[index][ ltpIndex ] | u(6) |
|    vmc_transform_lifting_quantization_parameters_z[index][ ltpIndex ] | u(6) |
|      for(i=0; i< asps_vmc_ext_subdivision_iteration_count; i++){ | |
|     vmc_transform_lifting_lod_qp_offset_x[index][ ltpIndex ][ i ] | u(6) |
|     vmc_transform_lifting_lod_qp_offset_y[index][ ltpIndex ][ i ] | u(6) |
|     vmc_transform_lifting_lod_qp_offset_z[index][ ltpIndex ][ i ] | u(6) |
|      } | |
|    vmc_transform_log2_lifting_update_weight[index][ ltpIndex ] | ue(v) |
|    vmc_transform_log2_lifting_prediction_weight[index][ ltpIndex ] | ue(v) |
| } | |

The QP applied for a particular LOD may be obtained by combining the base QP parameters and one or more QP offset parameters for the respective dimension.

In one example, the LOD offsets are signaled with respect to the base QP. So, for dimension x, QP applied to LOD level L, $QP_L$ may be derived as vmc_transform_lifting_quantization_parameters_x[index][ltpIndex]+vmc_transform_lifting_lod_qp_offset_x[index][ltpIndex][i].

In another example, the LOD offsets are signaled with respect to the QP of the previous LOD level. So, for dimension x, $QP_L$ is derived as (L==0?vmc_transform_lifting_quantization_parameters_x[index][ltpIndex]:$QP_{L-1}$)+vmc_transform_lifting_lod_qp_offset_x[index][ltpIndex][i].

(Examples above also apply similarly to the other dimensions y and z).

Note that although examples above show that the QP parameters are signaled as a 6-bit value, depending on the QP range allowed, the number of bits may be different. For example, if the QP range is 0 to 100, then the QP offsets may range from [−100, 100] and an 8-bit value may be used for signaling the QP offsets.

In some examples, one QP offset/scale may be signaled for each LOD level and it is applied to all the three dimensions x, y and z.

In another example, signaling of the QP offset/scale values for LODs may be controlled by a flag specifying whether QP offsets/scale values are signaled at the granularity of LOD level. An example of such signaling is as follows (shown between   below):

| | Descriptor |
|---|---|
| vmc_lifting_transform_parameters( index, ltpIndex ){ | |
|    vmc_transform_lifting_skip_update_flag[index][ ltpIndex ] | u(1) |
|    vmc_transform_lifting_quantization_parameters_x[index][ ltpIndex ] | u(6) |
|    vmc_transform_lifting_quantization_parameters_y[index][ ltpIndex ] | u(6) |
|    vmc_transform_lifting_quantization_parameters_z[index][ ltpIndex ] | u(6) |
|    vmc_transform_lifting_lod_qp_present_flag[index][ ltpIndex ] | u(1) |
|    if(vmc_transform_lifting_lod_qp_present_flag[index][ ltpIndex ] ) | |
|      for(i=0; i< asps_vmc_ext_subdivision_iteration_count; i++){ | |
|     vmc_transform_lifting_lod_qp_offset_x[index][ ltpIndex ][ i ] | u(6) |
|     vmc_transform_lifting_lod_qp_offset_y[index][ ltpIndex ][ i ] | u(6) |
|     vmc_transform_lifting_lod_qp_offset_z[index][ ltpIndex ][ i ] | u(6) |
|      } | |
|    vmc_transform_log2_lifting_update_weight[index][ ltpIndex ] | ue(v) |
|    vmc_transform_log2_lifting_prediction_weight[index][ ltpIndex ] | ue(v) |
| } | |

V-DMC encoder 200 and V-DMC decoder 300 may be configured to implement a reconstructed vertex position restriction.

As described above with respect to positions displacement, the vertex positions are reconstructed using displacement vectors as follows:

```
for ( v = 0; v < positionCount; ++v ) {
  for( d = 0; d < 3; d++ ) {
    positionsDisplaced[ v ][ d ] = positionsSubdiv[ v ][ d ] +
      dispArray[ v ][ 0 ] * normals[ v ][ d ] +
      dispArray[ v ][ 1 ] * tangents[ v ][ d ] +
      dispArray[ v ][ 2 ] * bitangents[ v ][ d ]
  }
}
```

It can be observed that the "positionsDisplaced" array is obtained by summation of the subdivided mesh vertex coordinates and the corresponding displacement vector components projected on the coordinate system, for example, the local system (normal, tangential, bitangential). However, given that the inverse quantization/scaling operation is unbounded, the reconstructed displaced positions may exceed the maximum position bitdepth. This disclosure sets forth potential solutions to this issue.

After addition of the displacement vector components, the "positionsDisplaced" or reconstructed position values are clipped depending on the minimum and maximum position values, for example:

Clip3 (min position, max position, positionsDisplaced), or Clip3(0, max position, positionsDisplaced) with max position determined by ((1<<bitDepthPosition)−1) and Clip3( ) a function defined as:

$$\text{Clip3}(x, y, z) = \begin{cases} x & ; & z < x \\ y & ; & z > y \\ z & ; & \text{otherwise} \end{cases}$$

In some examples, a normative constraint is imposed that a compliant bitstream may not result in reconstructed vertex positions that exceed the minimum and maximum position values as, for example, determined based on the position bitdepth value: 0 . . . ((1<<bitDepth-Position)−1)

V-DMC encoder 200 and V-DMC decoder 300 may be configured to perform quantization parameter granularity adjustment. Given the current quantization scale formulas (floating point precision) in WD 2.0 per displacement dimension:

iscale[*d*]=*qp*>=0?pow(0.5,16−bitDepthPosition+(4−*qp*)/6):0.0 scale[*d*]=*qp*>=0?pow(2.0,16−bitDepthPosition+(4−*qp*)/6):0.0

Additional quantization scale granularity is achieved by increasing the value 6, for example to value 8, while granularity is reduced by decreasing the value 6, for example to value 4 or 2.

Figure 9:
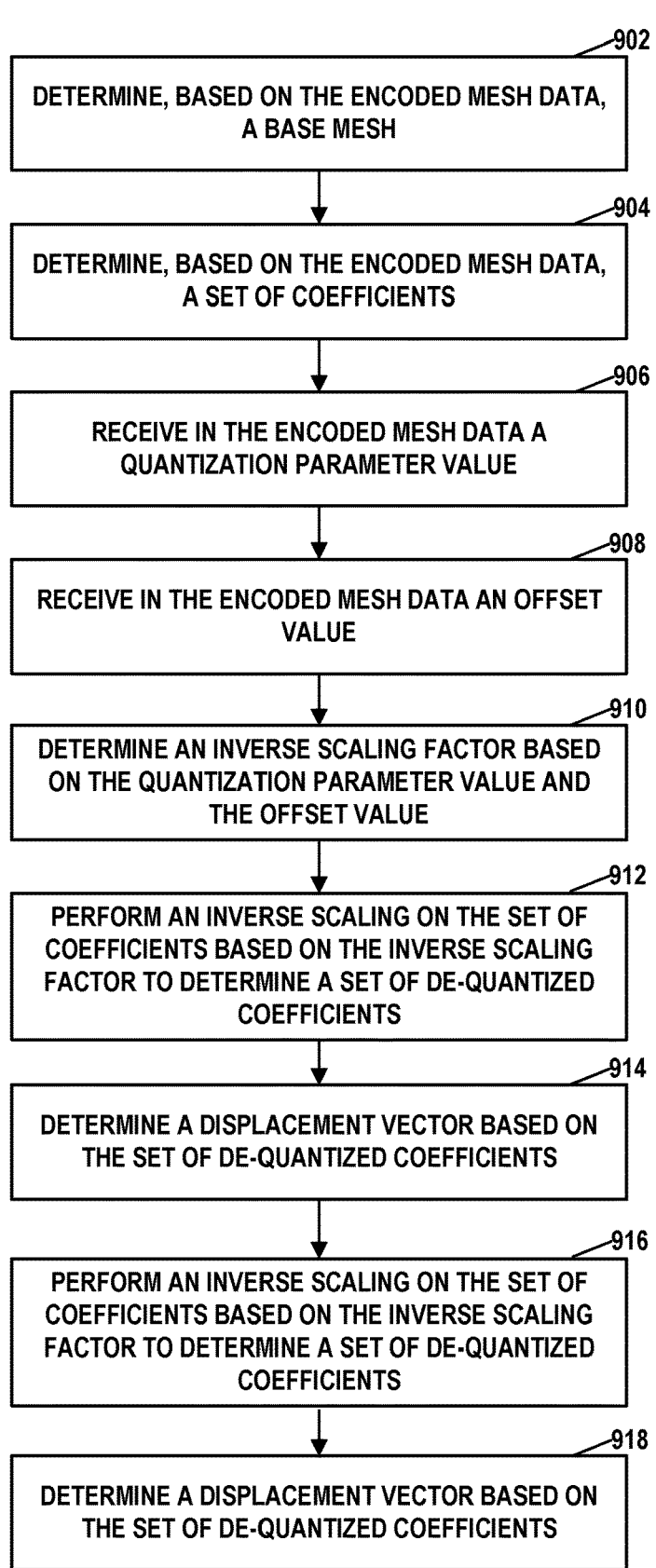
FIG. 9 is a flowchart illustrating an example process for decoding a compressed bitstream of mesh data.

FIG. 9 is a flowchart illustrating an example process for decoding a compressed bitstream of mesh data. Although described with respect to V-DMC decoder 300 (FIGS. 1 and 2), it should be understood that other devices may be configured to perform a process similar to that of FIG. 9.

In the example of FIG. 9, V-DMC decoder 300 determines, based on the encoded mesh data, a base mesh (902). V-DMC decoder 300 determines, based on the encoded mesh data, a set of coefficients (904). V-DMC decoder 300 receives in the encoded mesh data a quantization parameter value (906). As explained above, the quantization parameter value may have a minimum value of 0 and a maximum value of 100.

V-DMC decoder 300 receives in the encoded mesh data a bit depth offset value (908). The bit depth offset value may, for example, be an integer value. In some examples, V-DMC decoder 300 may receive three syntaxes, with each syntax element indicating a bit depth offset value for a dimension of a displacement vector. Each of the three syntax elements may, for example, be a 2-bit syntax element.

V-DMC decoder 300 determines an inverse scaling factor based on the quantization parameter value and the bit depth offset value (910). V-DMC decoder 300 performs an inverse scaling on the set of coefficients based on the inverse scaling factor to determine a set of de-quantized coefficients (912). To determine the inverse scaling factor based on the quantization parameter value and the bit depth offset value, V-DMC decoder 300 may be configured to determine the inverse scaling factor according to the equation:

iscale[*d*]=*qp*>=0?pow(0.5,16+offset−bitDepthPosition+(4−*qp*)/6):0.0, with iscale representing the inverse scaling factor, qp representing a value determined based on the quantization parameter value, offset representing the bit depth offset value, bitDepthPosition representing a bit depth of position coordinates in the base mesh, and pow(M,E) representing a function of M to the power E.

V-DMC decoder 300 determines a displacement vector based on the set of de-quantized coefficients (914). To determine the displacement vector based on the set of de-quantized coefficients, V-DMC decoder 300 may be further configured to apply an inverse transform to the set of de-quantized coefficients.

V-DMC decoder 300 deforms the base mesh based on the displacement vector to determine a decoded mesh (916). V-DMC decoder 300 outputs the decoded mesh (918). V-DMC decoder 300 may, for example, output the decoded mesh for display, storage, or transmission.

Examples in the various aspects of this disclosure may be used individually or in any combination.

The following numbered clauses illustrate one or more aspects of the devices and techniques described in this disclosure.

Clause 1A: A method of processing mesh data, the method comprising: any technique or combination of techniques described in this disclosure.

Clause 2A: The method of any of clause 1, further comprising generating the mesh data.

Clause 3A: A device for processing mesh data, the device comprising: a memory configured to store the mesh data; and one or more processors coupled to the memory, implemented in circuitry, and configured to perform any technique or combination of techniques described in this disclosure.

Clause 4A: The device clause 3A, wherein the device comprises a decoder.

Clause 5A: The device of clause 3A, wherein the device comprises an encoder.

Clause 6A: The device of any of clauses 3A-4A, further comprising a device to generate the mesh data.

Clause 7A: The device of any of clauses 3A-6A, further comprising a display to present imagery based on data.

Clause 8A: A computer-readable storage medium having stored thereon instructions that, when executed, cause one or more processors to perform any technique or combination of techniques described in this disclosure.

Clause 1B: A device for decoding encoded mesh data, the device comprising: one or more memory units; one or more processing units implemented in circuitry, coupled to the one or more memory units, and configured to: determine, based on the encoded mesh data, a base mesh; determine, based on the encoded mesh data, a set of coefficients; receive in the encoded mesh data a quantization parameter value; receive in the encoded mesh data a bit depth offset value; determine an inverse scaling factor based on the quantization parameter value and the bit depth offset value; perform an inverse scaling on the set of coefficients based on the inverse scaling factor to determine a set of de-quantized coefficients; determine a displacement vector based on the set of de-quantized coefficients; deform the base mesh based on the displacement vector to determine a decoded mesh; and output the decoded mesh.

Clause 2B: The device of clause 1B, wherein to determine the displacement vector based on the set of de-quantized coefficients, the one or more processing units are configured to apply an inverse transform to the set of de-quantized coefficients.

Clause 3B: The device of clause 1B or 2B, wherein to receive in the encoded mesh data the bit depth offset value, the one or more processing units are configured to receive a 2B-bit syntax element, wherein the bit depth offset value comprises an integer value.

Clause 4B: The device of any of clauses 1B-3B, further the one or more processing units are further configured to: determine the inverse scaling factor based on a bit depth of position coordinates in the mesh.

Clause 5B: The device of any of clauses 1B-4B, wherein the quantization parameter value has a minimum value of 0 and a maximum value of 100.

Clause 6B: The device of any of clauses 1B-5B, wherein the displacement vector comprises values for each of three different dimensions and the bit depth offset value comprises a bit depth offset value for one of the three different dimensions.

Clause 7B: The device of any of clauses 1B-6B, further comprising: receiving a first syntax element indicating a first bit depth offset value for a first dimension; receiving a second syntax element indicating a second bit depth offset value for a second dimension; and receiving a third syntax element indicating a third bit depth offset value for a third dimension, wherein the bit depth offset value corresponds to one of the first bit depth offset value, the second bit depth offset value, or the third bit depth offset value.

Clause 8B: The device of any of clauses 1B-7B, wherein to determine the inverse scaling factor based on the quantization parameter value and the bit depth offset value, the one or more processing units are configured to determine the inverse scaling factor according to the equation:

$$\text{iscale}[d]=qp\!>=\!0?\text{pow}(0.5,16+\text{offset}-\text{bitDepthPosition}+(4-qp)/6):0.0,$$

wherein iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

Clause 9B: The device of any of clauses 1B-8B, further comprising: a display configured to display the decoded mesh.

Clause 10B: A method of decoding encoded mesh data, the method comprising: determining, based on the encoded mesh data, a base mesh; determining, based on the encoded mesh data, a set of coefficients; receiving in the encoded mesh data a quantization parameter value; receiving in the encoded mesh data a bit depth offset value; determining an inverse scaling factor based on the quantization parameter value and the bit depth offset value; performing an inverse scaling on the set of coefficients based on the inverse scaling factor to determine a set of de-quantized coefficients; determining a displacement vector based on the set of de-quantized coefficients; deforming the base mesh based on the displacement vector to determine a decoded mesh; and outputting the decoded mesh.

Clause 11B: The method of clause 10B, wherein determining the displacement vector based on the set of de-quantized coefficients comprises applying an inverse transform to the set of de-quantized coefficients.

Clause 12B: The method of clause 10B or 11B, wherein receiving in the encoded mesh data the bit depth offset value comprises receiving a 2B-bit syntax element, wherein the bit depth offset value comprises an integer value.

Clause 13B: The method of any of clauses 10B-12B, further comprising: determining the inverse scaling factor based on a bit depth of position coordinates in the base mesh.

Clause 14B: The method of any of clauses 10B-13B, wherein the quantization parameter value has a minimum value of 0 and a maximum value of 100.

Clause 15B: The method of any of clauses 10B-14B, wherein the displacement vector comprises values for each of three different dimensions and the bit depth offset value comprises a bit depth offset value for one of the three different dimensions.

Clause 16B: The method of any of clauses 10B-15B, further comprising: receiving a first syntax element indicating a first bit depth offset value for a first dimension; receiving a second syntax element indicating a second bit depth offset value for a second dimension; and receiving a third syntax element indicating a third bit depth offset value for a third dimension, wherein the offset value corresponds to one of the first bit depth offset value, the second bit depth offset value, or the third bit depth offset value.

Clause 17B: The method of any of clauses 10B-16B, wherein determining the inverse scaling factor based on the quantization parameter value and the bit depth offset value comprises determining the inverse scaling factor according to the equation:

$$\text{iscale}[d]=qp\!>=\!0?\text{pow}(0.5,16+\text{offset}-\text{bitDepthPosition}+(4-qp)/6):0.0,$$

wherein iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

Clause 18B: A computer-readable storage medium storing instructions that when executed by one or more processors cause the one or more processors to: determine, based on encoded mesh data, a base mesh; determine, based on the encoded mesh data, a set of coefficients; receive in the encoded mesh data a quantization parameter value; receive in the encoded mesh data a bit depth offset value; determine an inverse scaling factor based on the quantization parameter value and the bit depth offset value; perform an inverse scaling on the set of coefficients based on the inverse scaling factor to determine a set of de-quantized coefficients; determine a displacement vector based on the set of de-quantized coefficients; deform the base mesh based on the displacement vector to determine a decoded mesh; and output the decoded mesh.

Clause 19B: The computer-readable storage medium of clause 18B, wherein to determine the displacement vector based on the set of de-quantized coefficients, the instructions cause the one or more processors to apply an inverse transform to the set of de-quantized coefficients.

Clause 20B: The computer-readable storage medium of clause 18B or 19B, wherein to receive in the encoded mesh data the bit depth offset value, the instructions cause the one or more processors to receive a 2B-bit syntax element, wherein the bit depth offset value comprises an integer value.

Clause 21B: The computer-readable storage medium of any of clauses 18B-20B, storing instructions that cause the one or more processors to: determine the inverse scaling factor based on a bit depth of position coordinates in the base mesh.

Clause 22B: The computer-readable storage medium of any of clauses 18B-21B, wherein the quantization parameter value has a minimum value of 0 and a maximum value of 100.

Clause 23B: The computer-readable storage medium of any of clauses 18B-22B, wherein the displacement vector comprises values for each of three different dimensions and the bit depth offset value comprises a bit depth offset value for one of the three different dimensions.

Clause 24B: The computer-readable storage medium of any of clauses 18B-23B, storing instructions that cause the one or more processors to: receive a first syntax element indicating a first bit depth offset value for a first dimension;

receive a second syntax element indicating a second bit depth offset value for a second dimension; and receive a third syntax element indicating a third bit depth offset value for a third dimension, wherein the bit depth offset value corresponds to one of the first bit depth offset value, the second bit depth offset value, or the third bit depth offset value.

Clause 25B: The computer-readable storage medium of any of clauses 18B-24B, wherein to determine the inverse scaling factor based on the quantization parameter value and the bit depth offset value, the instructions cause the one or more processors to determine the inverse scaling factor according to the equation:

$$iscale[d]=qp>=0?pow(0.5,16+offset-bitDepthPosition+(4-qp)/6):0.0,$$

wherein iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

Clause 26B: A device for encoding encoded mesh data, the device comprising: one or more memory units; one or more processing units implemented in circuitry, coupled to the one or more memory units, and configured to: determine, from on an unencoded mesh, a base mesh; determine a set of displacement vectors for deforming the base mesh; transform the set of displacement vectors to determine a set of coefficients; perform a scaling on the set of coefficients based on a scaling factor to determine a set of scaled coefficients, wherein the scaling factor is a function of a quantization parameter value and a bit depth offset value; and generate an encoded bitstream that includes the quantization parameter value and the bit depth offset value.

Clause 27B: The device of clause 26B, wherein the bit depth offset value comprises an integer value.

Clause 28B: The device of clause 26B or 27B, wherein the scaling factor is also a function of a bit depth of position coordinates in the base mesh.

Clause 29B: The device of any of clauses 26B-28B, wherein the quantization parameter value has a minimum value of 0 and a maximum value of 100.

Clause 30B: The device of any of clauses 26B-29B, wherein to determine the scaling factor based on the quantization parameter value and the bit depth offset value, the one or more processing units are configured to determine the scaling factor according to the equation:

$$scale[d]=qp>=0?pow(2.0,16+offset-bitDepthPosition+(4-qp)/6):0.0$$

wherein scale represents the scaling factor, qp represents a value determined based on the quantization parameter value, offset represents the bit depth offset value, bitDepthPosition represents a bit depth of position coordinates in the decoded mesh, and pow(M,E) represents a function of M to the power E.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded mesh data, the device comprising:

one or more memory units;

one or more processing units implemented in circuitry, coupled to the one or more memory units, and configured to:

determine, based on the encoded mesh data, a base mesh;

determine, based on the encoded mesh data, a set of coefficients;

receive in the encoded mesh data a quantization parameter value;

receive in the encoded mesh data a bit depth offset value;

determine an inverse scaling factor based on the quantization parameter value and adding the bit depth offset value to a constant value;

perform an inverse scaling on the set of coefficients based on the inverse scaling factor to determine a set of de-quantized coefficients;

determine a displacement vector based on the set of de-quantized coefficients;

deform the base mesh based on the displacement vector to determine a decoded mesh; and output the decoded mesh.

2. The device of claim 1, wherein to determine the displacement vector based on the set of de-quantized coefficients, the one or more processing units are configured to apply an inverse transform to the set of de-quantized coefficients.

3. The device of claim 1, wherein to receive in the encoded mesh data the bit depth offset value, the one or more processing units are configured to receive a 2-bit syntax element, wherein the bit depth offset value comprises an integer value.

4. The device of claim 1, further the one or more processing units are further configured to:

determine the inverse scaling factor based on a bit depth of position coordinates in the mesh.

5. The device of claim 1, wherein the quantization parameter value has a minimum value of 0 and a maximum value of 100.

6. The device of claim 1, wherein the displacement vector comprises values for each of three different dimensions and the bit depth offset value comprises a bit depth offset value for one of the three different dimensions.

7. The device of claim 1, further comprising:

receiving a first syntax element indicating a first bit depth offset value for a first dimension;

receiving a second syntax element indicating a second bit depth offset value for a second dimension; and receiving a third syntax element indicating a third bit depth offset value for a third dimension, wherein the bit depth offset value corresponds to one of the first bit depth offset value, the second bit depth offset value, or the third bit depth offset value.

8. The device of claim 1, wherein to determine the inverse scaling factor based on the quantization parameter value and the bit depth offset value, the one or more processing units are configured to determine the inverse scaling factor according to the equation:

$$iscale[d]=qp>=0?pow(0.5,16+offset-bitDepthPosition+(4-qp)/6):0.0,$$

wherein 16 is the constant value;

iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

9. The device of claim 1, further comprising:

a display configured to display the decoded mesh.

10. A method of decoding encoded mesh data, the method comprising:

determining, based on the encoded mesh data, a base mesh;

determining, based on the encoded mesh data, a set of coefficients;

receiving in the encoded mesh data a quantization parameter value;

receiving in the encoded mesh data a bit depth offset value;

determining an inverse scaling factor based on the quantization parameter value and adding the bit depth offset value to a constant value;

performing an inverse scaling on the set of coefficients based on the inverse scaling factor to determine a set of de-quantized coefficients;

determining a displacement vector based on the set of de-quantized coefficients;

deforming the base mesh based on the displacement vector to determine a decoded mesh; and outputting the decoded mesh.

11. The method of claim 10, wherein determining the displacement vector based on the set of de-quantized coefficients comprises applying an inverse transform to the set of de-quantized coefficients.

12. The method of claim 10, wherein receiving in the encoded mesh data the bit depth offset value comprises receiving a 2-bit syntax element, wherein the bit depth offset value comprises an integer value.

13. The method of claim 10, further comprising:

determining the inverse scaling factor based on a bit depth of position coordinates in the base mesh.

14. The method of claim 10, wherein the quantization parameter value has a minimum value of 0 and a maximum value of 100.

15. The method of claim 10, wherein the displacement vector comprises values for each of three different dimensions and the bit depth offset value comprises a bit depth offset value for one of the three different dimensions.

16. The method of claim 10, wherein determining the inverse scaling factor based on the quantization parameter value and the bit depth offset value comprises determining the inverse scaling factor according to the equation:

$$iscale[d]=qp>=0?pow(0.5,16+offset-bitDepthPosition+(4-qp)/6):0.0,$$

wherein 16 is the constant value;

iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

17. A computer-readable storage medium storing instructions that when executed by one or more processors cause the one or more processors to:

determine, based on encoded mesh data, a base mesh;

determine, based on the encoded mesh data, a set of coefficients;

receive in the encoded mesh data a quantization parameter value;

receive in the encoded mesh data a bit depth offset value;

determine an inverse scaling factor based on the quantization parameter value and adding the bit depth offset value to a constant value;

perform an inverse scaling on the set of coefficients based on the inverse scaling factor to determine a set of de-quantized coefficients;

determine a displacement vector based on the set of de-quantized coefficients;

deform the base mesh based on the displacement vector to determine a decoded mesh; and output the decoded mesh.

18. The computer-readable storage medium of claim 17, wherein to determine the displacement vector based on the set of de-quantized coefficients, the instructions cause the one or more processors to apply an inverse transform to the set of de-quantized coefficients.

19. The computer-readable storage medium of claim 17, storing instructions that cause the one or more processors to:

determine the inverse scaling factor based on a bit depth of position coordinates in the base mesh.

20. The computer-readable storage medium of claim 17, wherein the quantization parameter value has a minimum value of 0 and a maximum value of 100.

21. The computer-readable storage medium of claim 17, wherein the displacement vector comprises values for each of three different dimensions and the bit depth offset value comprises a bit depth offset value for one of the three different dimensions.

22. The computer-readable storage medium of claim 17, storing instructions that cause the one or more processors to:

receive a first syntax element indicating a first bit depth offset value for a first dimension;

receive a second syntax element indicating a second bit depth offset value for a second dimension; and receive a third syntax element indicating a third bit depth offset value for a third dimension, wherein the bit depth offset value corresponds to one of the first bit depth offset value, the second bit depth offset value, or the third bit depth offset value.

23. The computer-readable storage medium of claim 17, wherein to determine the inverse scaling factor based on the quantization parameter value and the bit depth offset value, the instructions cause the one or more processors to determine the inverse scaling factor according to the equation:

$$\text{iscale}[d]=qp>=0?\text{pow}(0.5,16+\text{offset}-\text{bitDepthPosition}+(4-qp)/6):0.0,$$

wherein 16 is the constant value;

iscale represents the inverse scaling factor, qp represents a value determined based on the quantization parameter value, offset represents the bit depth offset value, bitDepthPosition represents a bit depth of position coordinates in the decoded mesh, and pow(M,E) represents a function of M to the power E.

24. A device for encoding unencoded mesh data, the device comprising:

one or more memory units;

one or more processing units implemented in circuitry, coupled to the one or more memory units, and configured to:

determine, from on an unencoded mesh, a base mesh;

determine a set of displacement vectors for deforming the base mesh;

transform the set of displacement vectors to determine a set of coefficients;

perform a scaling on the set of coefficients based on a scaling factor to determine a set of scaled coefficients, wherein the scaling factor is a function of a quantization parameter value and a bit depth offset value added to a constant value; and generate an encoded bitstream that includes the quantization parameter value and the bit depth offset value.

25. The device of claim 24, wherein the bit depth offset value comprises an integer value.

26. The device of claim 24, wherein the scaling factor is also a function of a bit depth of position coordinates in the base mesh.

27. The device of claim 24, wherein the quantization parameter value has a minimum value of 0 and a maximum value of 100.

28. The device of claim 24, wherein to determine the scaling factor based on the quantization parameter value and the bit depth offset value, the one or more processing units are configured to determine the scaling factor according to the equation:

$$\text{scale}[d]=qp>=0?\text{pow}(2.0,16+\text{offset}-\text{bitDepthPosition}+(4-qp)/6):0.0$$

wherein 16 is the constant value;

scale represents the scaling factor, qp represents a value determined based on the quantization parameter value, offset represents the bit depth offset value, bitDepthPosition represents a bit depth of position coordinates in the unencoded mesh, and pow(M,E) represents a function of M to the power E.

29. The device of claim 24, wherein the one or more processing units further comprise a graphics engine configured to generate the unencoded mesh data.

30. The device of claim 29, further comprising:

one or more sensors configured to obtain sensor data, wherein the graphics engine is configured to generate the unencoded mesh data based on the sensor data.

* * * * *